(12) United States Patent  
Heidmann

(10) Patent No.: US 7,928,602 B2  
(45) Date of Patent: Apr. 19, 2011

(54) POWER FLOOR METHOD AND ASSEMBLY

(75) Inventor: Kurt Heidmann, Grand Rapids, MI (US)

(73) Assignee: Steelcase Development Corporation, Grand Rapids, MI (US)

( * ) Notice: Subject to any disclaimer, the term of this patent is extended or adjusted under 35 U.S.C. 154(b) by 1054 days.

(21) Appl. No.: 11/731,477

(22) Filed: Mar. 30, 2007

(65) Prior Publication Data

US 2008/0238216 A1    Oct. 2, 2008

(51) Int. Cl.
H05H 3/02    (2006.01)

(52) U.S. Cl. .......................................... 307/42

(58) Field of Classification Search .............. 307/42; 713/320; 52/220.1, 220.8
See application file for complete search history.

(56) References Cited

U.S. PATENT DOCUMENTS

| | | |
|---|---|---|
| 0,491,660 A | 2/1893 | Little |
| 3,068,376 A | 12/1962 | Hammel et al. |
| 3,401,469 A | 9/1968 | Shaver et al. |
| 3,494,657 A | 2/1970 | Tatlinger et al. |
| 3,522,474 A | 8/1970 | Piel |
| 3,610,933 A | 10/1971 | Shaver et al. |
| 3,675,954 A | 7/1972 | Konig |
| 3,696,283 A | 10/1972 | Ackley |
| 3,809,966 A | 5/1974 | Tirrell et al. |
| 3,809,967 A | 5/1974 | Tirrell et al. |
| 3,860,317 A | 1/1975 | Williams et al. |
| 4,074,488 A | 2/1978 | Ray |
| 4,296,574 A | 10/1981 | Stephens |
| 4,428,078 A | 1/1984 | Kuo |
| 4,578,731 A | 3/1986 | Andriessen et al. |
| 4,682,453 A | 7/1987 | Holmgren |
| 4,728,300 A | 3/1988 | Shillito et al. |
| 4,746,308 A * | 5/1988 | Mutte ............... 439/426 |
| 4,853,555 A | 8/1989 | Wheat |
| 5,049,700 A | 9/1991 | Kobayashi et al. |
| D339,789 S | 9/1993 | Foster et al. |
| 5,263,289 A | 11/1993 | Boyd |
| 5,385,785 A * | 1/1995 | Lovell .............. 428/408 |
| 5,440,841 A | 8/1995 | Greenfield |
| 5,483,776 A * | 1/1996 | Poppe .............. 52/220.3 |
| 5,794,392 A | 8/1998 | Forslund et al. |

(Continued)

FOREIGN PATENT DOCUMENTS

DE    4290571 C2 *    1/1997

(Continued)

*Primary Examiner* — Albert W Paladini  
(74) *Attorney, Agent, or Firm* — Quarles & Brady LLP

(57) ABSTRACT

A power floor tile assembly and method for providing power to furniture components via a floor structure, the tile assembly including a plurality of floor tiles, each tile including a substantially rigid supporting substrate member that includes top and bottom surfaces and an edge, at least a first conductive tile contact supported by the substrate member and extending to an exposed end and a covering layer having top and bottom surfaces and a thickness dimension between the top and bottom surfaces, the covering layer forming a separate opening for each of the tile contacts, the openings aligned with the tile contacts so that each tile contact extends through a separate one of the openings, the covering layer having a thickness dimension between the top and bottom surfaces such that the exposed end of each tile contact protrudes past the top surface of the covering layer, wherein each supporting substrate and associated covering layer are shaped such that the tile can be arranged with other tiles in side by side fashion to provide a substantially contiguous floor structure.

48 Claims, 15 Drawing Sheets

U.S. PATENT DOCUMENTS

| | | | |
|---|---|---|---|
| 5,900,715 A | 5/1999 | Roberts | |
| 5,996,294 A | 12/1999 | Forslund et al. | |
| 6,202,374 B1 | 3/2001 | Cooper et al. | |
| 6,311,440 B1 | 11/2001 | Feldpausch et al. | |
| 6,430,882 B1 | 8/2002 | Feldpausch et al. | |
| 6,455,773 B2 | 9/2002 | Bellanger | |
| 6,550,195 B1 | 4/2003 | Cooper et al. | |
| 6,578,498 B1 | 6/2003 | Draudt et al. | |
| 6,650,088 B1 | 11/2003 | Webb et al. | |
| 6,684,582 B2 | 2/2004 | Peart et al. | |
| 6,748,707 B1 | 6/2004 | Buchalter et al. | |
| 6,761,578 B1 | 7/2004 | Stavely et al. | |
| 6,909,373 B2 * | 6/2005 | Power et al. | 340/665 |
| 6,913,477 B2 | 7/2005 | Dayan et al. | |
| 7,052,771 B2 * | 5/2006 | Nieminen | 428/457 |
| 2003/0015332 A1 | 1/2003 | Hassam et al. | |
| 2004/0082369 A1 | 4/2004 | Dayan et al. | |
| 2005/0052156 A1 * | 3/2005 | Liebenow | |
| 2005/0102935 A1 * | 5/2005 | Picard | |
| 2005/0208817 A1 * | 9/2005 | Dayan et al. | |

FOREIGN PATENT DOCUMENTS

| | | | |
|---|---|---|---|
| DE | 20008880 U1 * | 1/2001 | |
| EP | 0042690 A1 | 12/1981 | |
| EP | 0460487 A1 | 12/1991 | |
| EP | 601232 A1 * | 6/1994 | |
| EP | 692837 A1 | 1/1996 | |
| EP | 637119 B1 * | 11/1997 | |
| FR | 2748150 A1 | 10/1997 | |
| FR | 2813712 B1 | 3/2002 | |
| GB | 2282715 A | 4/1995 | |
| JP | 02241309 A | 9/1990 | |
| JP | 2000288724 A2 * | 5/1991 | |
| JP | 3117334 A2 * | 10/2000 | |
| JP | 03027867 | 3/2007 | |
| WO | 91/05394 A1 | 4/1991 | |
| WO | 93/15929 A1 | 8/1993 | |
| WO | 99/63171 A2 | 12/1999 | |
| WO | 01/37394 A1 | 2/2001 | |

* cited by examiner

POWER FLOOR METHOD AND ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to power delivery systems and more specifically to floor assemblies for delivering power to furniture components that are supported by the floor irrespective of the location of the furniture component on the supporting floor structure.

A large number of different powered components and devices have been developed that require electrical power to perform various functions. Exemplary powered components include lights, phones, ovens, computers, motors, coffee makers, radios, televisions, printers, fax machines, copiers, etc. The conventional way to deliver power to powered components has been to attach a separate electrical cord for each of the components where the cord includes a male connector that is received in a female wall or floor mounted outlet. Thus, where ten separate powered components are located on a table, ten separate cords have been required for power delivery.

While cords perform the primary power delivery function well, unfortunately corded power delivery has several shortcomings. First, cords necessarily tether powered components to outlets and therefore restrict movement of associated components within a space.

Second, cords in general are unsightly. In this regard, most cords are provided in lengths that are usable for various applications. Thus, for instance, a ten foot power cord may be provided so that a powered component can be plugged into an outlet and located anywhere within a ten foot distance of the outlet. Here, while the ten foot length allows flexible placement of the powered component, often less than ten feet of cord is required (e.g., where the component is located three feet from an outlet) and the excess cord is simply heaped together between the component and the outlet. Unsightliness of power cords is exacerbated when multiple (e.g., ten) powered components are located in a small space.

Third, where several power cords are located proximate each other, often the cords become tangled and the process of determining which cord is associated with which component becomes confusing and time consuming.

Fourth, some cords have to be placed in locations where they restrict movement. For instance, where a cord has to be strung across a walkway to reach an outlet, the cord can present an obstacle for people passing by in the walkway.

Fifth, cords can become unplugged. In some cases when a cord becomes unplugged, the cord can simply be re-plugged into an outlet to resume operation of the powered component (e.g., in the case of a lamp). In other cases, however, unplugging can have an adverse effect on the workflow of a person using the component. For instance, in the case of a computer that stores data, unplugging can cause the loss of data and can require a rebooting process that is time consuming.

One solution to the power cord problems has been to provide batteries for powered components where the batteries move along with the components. The main problem with batteries is that batteries either have to be routinely replaced or need to be recharged periodically. For example, in the case of a laptop computer battery, most laptop batteries do not last more than three or four hours without a recharge.

Another solution to the power cord problems has been to provide an area power system that delivers power to powered components irrespective of the locations of those components within a "power area". For example, one known solution includes a system wherein stationary conductors are provided in an array adjacent a power area and where a powered component (a laptop computer, etc.) includes pickup contacts that slide across and make contact with the stationary conductors so that the conductors can provide power to the component. Here, in at least some embodiments, the power conducting system includes scanning switching devices that can be used to turn on power to specific conductors after a controller determines that the stationary conductors are in contact with pickup contacts on a powered component. The pattern and dimensions of the stationary power conductors are designed such that the pickup contacts make contact with at least two of the stationary conductors at all times.

To determine if a powered component currently contacts a pair of the stationary power conductors so that power should be supplied to the stationary conductors, each powered component includes an identification load (e.g., a resistor) and that separate low current signals are sequentially provided to each of the power conductors. When two of the pickup contacts on the powered component contact two of the stationary power conductors when a low current signal is applied via the scanning switching devices to one of the contacted stationary conductors, the low current passes through the identification load and returns to the power system through the second contacting stationary conductor. The returning current is used to read the identifying load and hence to determine that a component to be powered is linked to the two stationary conductors (i.e., to the conductor that the low current was provided to and to the conductor through which the current returned to the power system). Once the two contacting stationary conductors are identified, power is delivered through those conductors to the powered component.

Power area solutions have at least two shortcomings. First, the switching devices contemplated for scanning for and then providing higher current levels to electrical loads (i.e., to powered components) are complex and therefore would be expensive to configure. While expensive switching devices may be suitable in some applications used to charge small electronic devices (e.g., cellular phones, PDAs, etc.) where a small charging mat or the like can provide a sufficiently sized power area, where a larger power area is required, such complex switching devices would be prohibitively expensive in most applications.

Second, the number of switching devices required to link load contacts to either positive voltage or ground is large (i.e., at least one switching device is required per mat contact plate).

BRIEF SUMMARY OF THE INVENTION

Instead of providing a system that sequentially scans through stationary power contacts to determine which stationary contacts are currently making contact with moveable contacts on an object to be powered (e.g., a powered component or electrical load), according to at least one aspect of the present invention, a low signal current is provided to each of the stationary contacts all the time s(e.g., whenever the power area system is operational). Then, when one of the movable contacts of an electrical load makes contact with one of the stationary contacts, the low signaling current passes through the stationary contact to the movable contact that makes the contact and to a signal circuit on the electrical load. In at least some embodiments, the signal circuit is programmed to, when activated, draw current in a frequency pattern that can be recognized as a pattern associated with an electrical load. To this end, the signal circuit may include a controller and a switch where the switch is linked between positive and negative rails of the electrical load. When excited, the signal circuit controller may be programmed to open and close the switch between the rails at 1,000 Hz. A system controller monitors the current drawn by each stationary contact and, when a current draw pattern is recognized as a pattern associated with a known electrical load, the controller controls a switch to link a high power source (e.g., 3-20 amps) to the stationary contact that is in contact with the moveable contact on the electrical load.

Thus, the present invention can be implemented using simplified switching devices and using an extremely simple switching scheme.

In at least some embodiments a plurality of the stationary contacts are linked directly to ground. Hereinafter, grounded contacts are referred to as ground contacts while ungrounded stationary contacts that can be linked to a power source will be referred to as stationary power contacts or simply power contacts. In at least some inventive embodiments the pattern of grounded and power contacts is designed and a moveable contact pattern formed by the pickup shoe on an electrical load is designed so that whenever the shoe is supported by the powered surface that includes the stationary contacts, at least one moveable contact makes contact with one of the stationary power contacts and at least a second moveable contact makes contact with one of the stationary ground contacts.

In some embodiments different electrical loads may have different power requirements. To provide for different power requirements, it is contemplated that signal circuits of electrical loads may be programmed to cause different current draw patterns. For instance, a 1,000 Hz draw pattern may indicate that a 48 volt source should be linked to the electrical load while a 500 Hz draw pattern may indicate that a 12 volt source should be linked. Here, the power surface controller would be programmed to recognize the distinct draw patterns and link power accordingly.

In at least some embodiments it is contemplated that moveable contacts may be either positive or negative and that the power surface will have to be able to automatically determine polarity and render linked stationary contacts positive and negative accordingly. Here, a similar current draw pattern recognition process may be employed to identify the positive and negative moveable contacts.

In addition, according to at least one other aspect of the invention, power floor tiles and associated power/ground bus bars are contemplated that make it relatively easy to construct large powered floor configurations in new or existing spaces. Here, in at least some cases, power tiles are rectilinear and can be positioned adjacent each other to form contiguous floor structures. In some embodiments the bus bars include a power bar and a ground bar where each bar extends along a straight aligned edge of a plurality of tiles so that a single bar can be used to feed power to multiple tile assemblies. In some cases each tile includes one or more switching devices for selectively linking contacts or conductors supported thereby to a power source. In other cases switching devices are supported by the power bus bar.

It is also contemplated that data may be transferred through power contacts to furniture components or, in some cases, that separate data contacts may be provided in a floor structure and perhaps in a furniture pick-up shoe.

To the accomplishment of the foregoing and related ends, the invention, then, comprises the features hereinafter fully described. The following description and the annexed drawings set forth in detail certain illustrative aspects of the invention. However, these aspects are indicative of but a few of the -various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
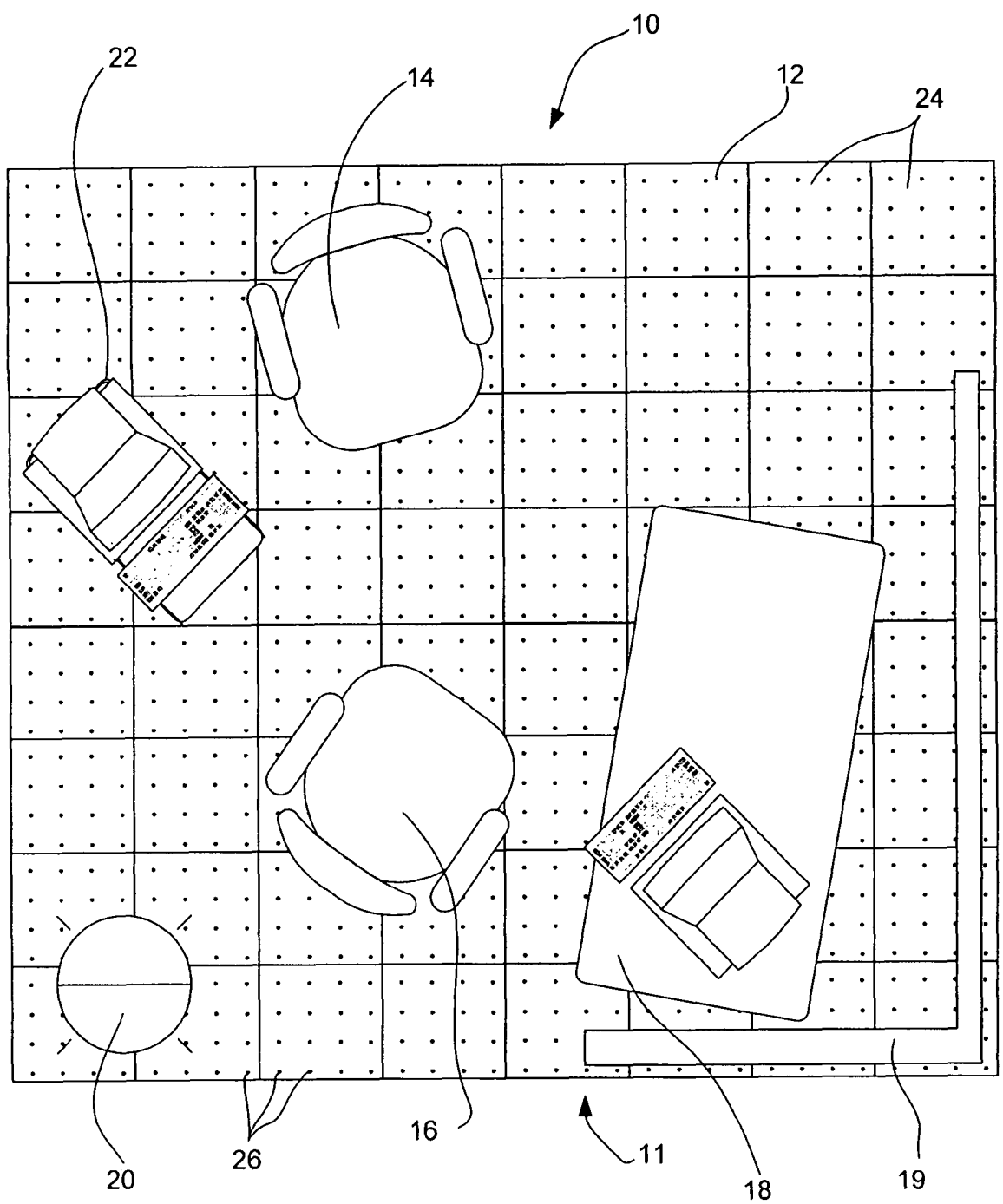
FIG. 1 is a top plan view of an office space including a floor structure according to at least one embodiment of the present invention.

Referring now to the drawing(s) wherein like reference numeral(s) and characters correspond to similar elements throughout the several views and, more specifically, referring to FIG. 1, the present invention will be described in the context of an exemplary office work space 10 that includes a floor structure 11 below the work space and a plurality of furniture components within the work space and supported by the floor structure 11. In FIG. 1, the exemplary furniture components include first and second task chairs 14 and 16, respectively, a desk or table 18, a computer cart 22, a light/lamp 20 and a partition/wall structure 19. In at least some embodiments a subset or all of the furniture components included in the furniture configuration 10 are supported by wheels or casters (e.g., see task chair 14 in FIG. 2 that includes wheels 40) to facilitate movement of the components within the work space on floor structure 11. In other embodiments, the furniture components may be moveable on top of floor structure 11 by sliding or lifting and movement to other locations within the workspace.

In at least some embodiments, a subset or all of the furniture components used within the workspace of FIG. 1 require power. For example, desk 18 and cart 22 support computers thereon and therefore require power for running those computers. In these cases, although not shown, desk 18 may include one or more supported outlets for providing power to devices/appliances supported thereby. Desk 18 may also include a motor driven height adjustable top surface that requires power and may support a light or other device that requires power. Similarly, lamp 20 requires power to generate light.

Figure 2:
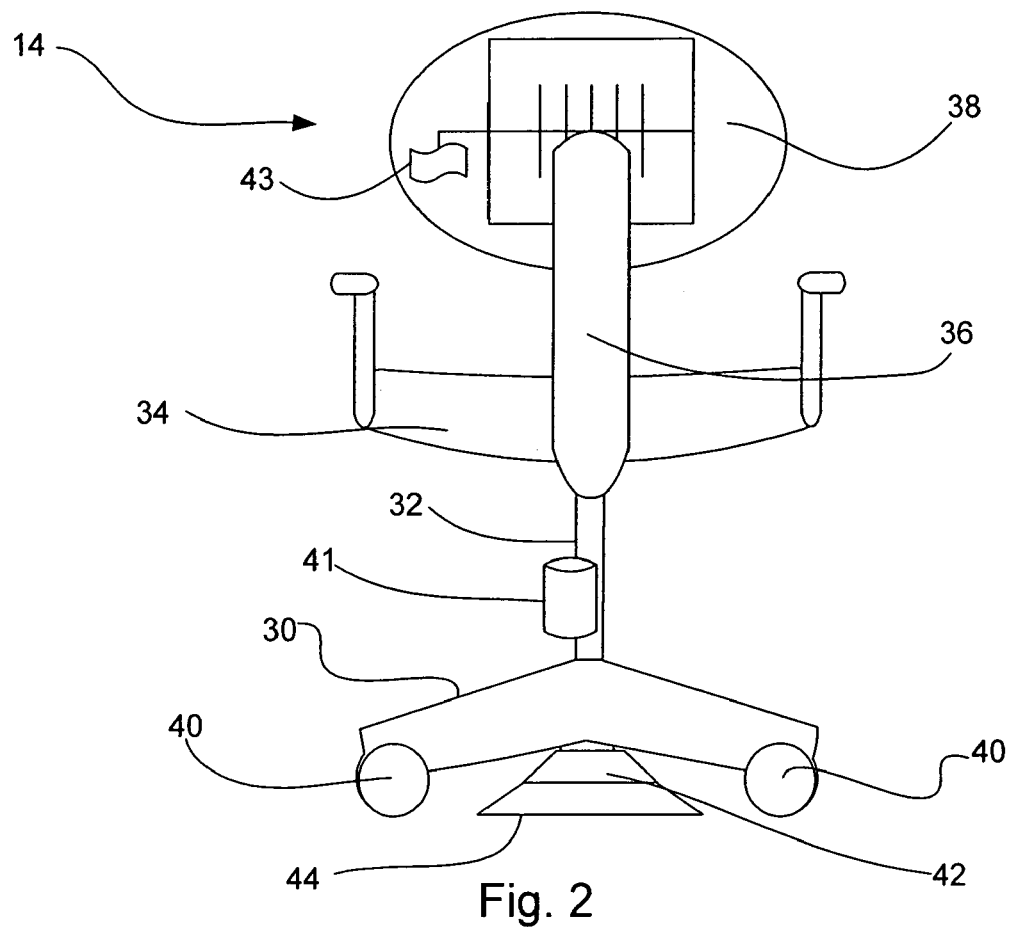
FIG. 2 is a rear view of one of the task chairs of FIG. 1.

Referring to FIG. 2, exemplary task chair 14 includes a motor 41 and a backrest heating unit 43, each of which require power. As the label implies, the backrest heating unit 43 generates heat within a chair backrest 38. Motor 41 is provided on a chair support shaft 32 for raising and lowering a chair seat 34. In addition to backrest 38, seat 34, post 32, motor 41 and heating unit 43, chair 14 includes a base support structure 30, casters/wheels 40 to facilitate movement of chair 14 on a floor structure and a pick-up shoe 42.

The present inventions will be described in the context of chair 14. nevertheless, it should be recognized that any of the furniture components 16, 18, 19, 20 or 22 or indeed any other furniture component that includes an electrical load of any type may include a power pick-up shoe like shoe 42 and may operate in a fashion similar to that described herein to receive power from floor structure 11.

The pick-up shoe 42, in the illustrated embodiment, is mounted below and to a central portion of the base structure 30 and extends down therefrom to a bottom surface 44 where the bottom surface 44 is essentially co-planar with the lowermost portions of wheels 40 so that, when chair 14 is supported by a floor structure (see 11 in FIG. 1) with wheels 40 in contact with the support structure 11, bottom surface 44 is generally in contact with the top surface of the floor structure 11. Although not illustrated, in at least some embodiments it is contemplated that shoe 42 will be spring loaded so that the shoe 42 can compress slightly upward and downward to accommodate imperfections in the floor structure and imperfect manufacturing tolerances of the chair 14.

Figure 3:
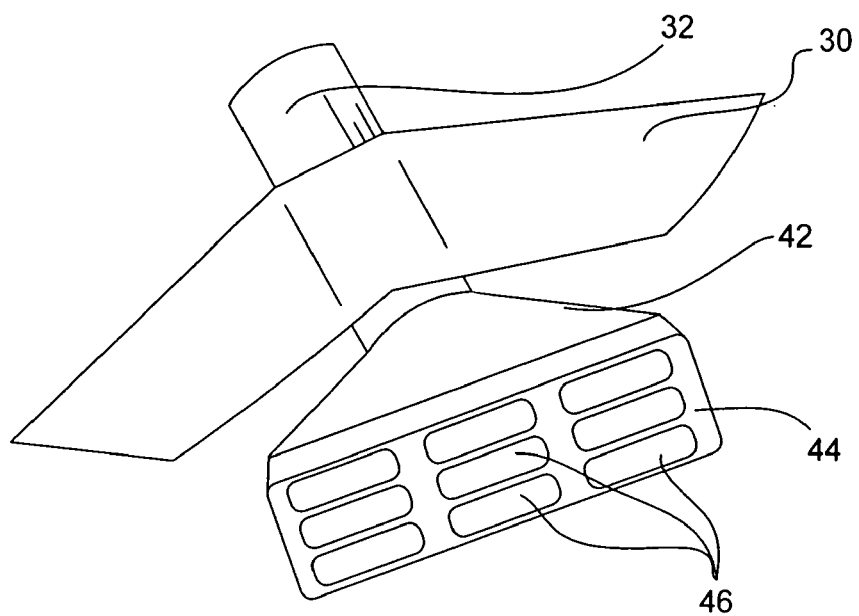
FIG. 3 is an enlarged perspective view of the pickup shoe that forms a portion of the chair assembly of FIG. 2.
Figure 18:
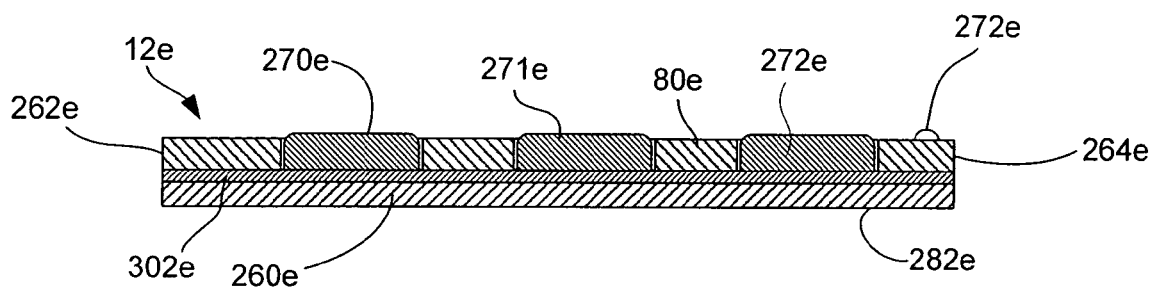
FIG. 18 is a cross sectional view taken along the line 18-18 in FIG. 17.

Referring still to FIGS. 1 and 2 and also now to FIG. 3, shoe 42 includes a plurality of contactors or moveable contacts 46 on an undersurface thereof where the moveable contact 46 are substantially flush with the undersurface 44. In the illustrated embodiment, shoe 42 includes moveable contacts 46 arranged in three columns of three contacts each. The moveable contacts are spaced apart (see the phantom in FIG. 4) by insulating portions of undersurface 44. In some embodiments each moveable contact 46 may have equal three to six inch length and width dimensions. For the purposes of this description, it will be assumed that each moveable contact 46 has a diagonal dimension of four inches and that the space between each two adjacent moveable contacts is one inch. Although shown as having square surfaces, other contactor shapes are contemplated (see phantom in FIG. 18).

Figure 4:
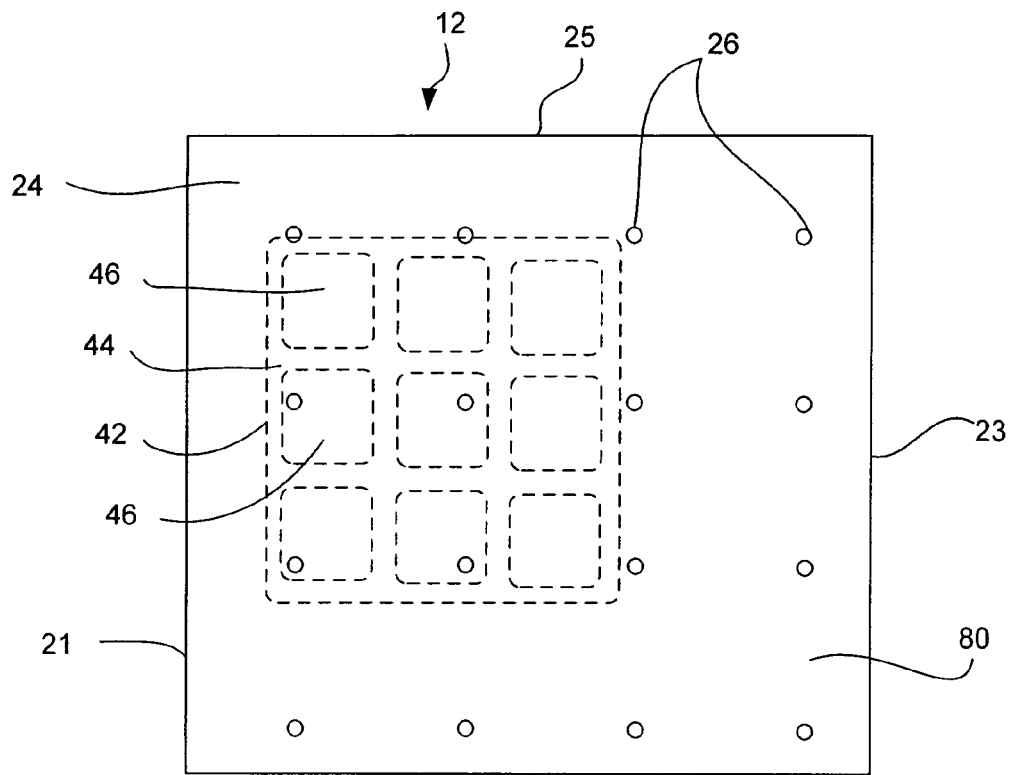
FIG. 4 is a plan view of one of the tile assemblies of FIG. 1.

Referring once again to FIG. 1 and also to FIGS. 4 and 6 through 9, in at least some embodiments, floor structure 11 is formed by a plurality of rectilinear power floor tiles 12. Referring specifically to FIG. 4, the illustrated tiles are square and, to that end, have first, second, third and fourth edges 21, 23, 25, and 27, respectively, such that, when the tiles are arranged in a side-by-side fashion, they can form a substantially contiguous floor structure 11 as shown in FIG. 1.

Figure 8:
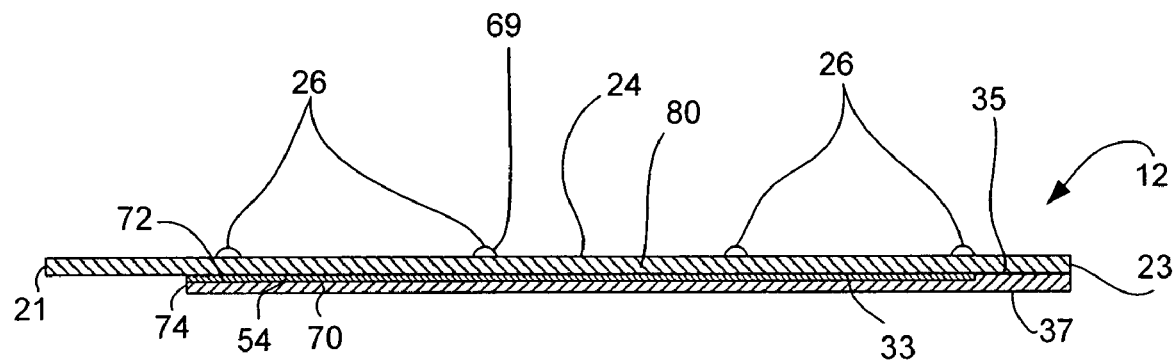
FIG. 8 is a cross sectional view of the tile assembly of FIG. 6 taken along the line 8-8.

Referring to FIGS. 4 and 6 through 9, exemplary tile 12 includes a supporting substrate 70, a plurality of conductive members 54, a plurality of stationary floor or tile contacts 26 and a covering layer 80. In this embodiment, the covering layer 80 forms the square shape defined by edges 21, 23, 25 and 27. Substrate 70 has a shape and dimension similar to that of covering layer 80, albeit where, when the covering layer 80 is aligned with and placed over the substrate 70, an edge 74 of substrate 70 is recessed slightly from edge 21 as best shown in FIG. 8. In some embodiments, edge 74 is recessed between ½ and 2 inches from covering layer edge 21. The recess is provided to accommodate power and/or ground bus bars as described hereafter.

Supporting substrate 70 is formed of a substantially rigid material such as plastic, pressed fiber board, etc., and includes oppositely facing top and bottom surfaces 35 and 37, respectively. Substrate 70 forms a plurality of recesses 72 (see FIG. 8) in top surface 35 that extend from edge 74 to termination points at different locations on top surface 72. In the illustrated embodiment, sixteen different channels 72 are formed in top surface 35, a separate recess corresponding to each one of sixteen different conductive members 54 where the channels extend from edge 74 to termination points that are substantially equispaced along the top surface 35. In the illustrated example, the sixteen channels terminate at sixteen termination points that are arranged in four columns of four termination points each. Although all of the channels in the illustrated embodiment are formed in the top surface of the substrate, in some embodiments all or a subset of the channels may be formed in the bottom surface of the substrate.

Referring still to FIGS. 6 through 10, in addition to forming the channels 72, substrate 70 forms openings or recesses 84 adjacent the termination points of the channels 72 where each opening extends completely through the substrate from the top surface 35 through to the bottom surface 37 or is at least deeper than an associated channel. In the illustrated embodiment, the openings 84 are rectangular. In other embodiments, the openings 84 may be other shapes and dimensions.

Exemplary tile 12 includes sixteen conductive members 54 that are received within channel 72, each of the conductive members 54 extending from substrate edge 74 to a separate one of the termination points at the distal ends of the channel 72. In the illustrated embodiment, each conductive member is a substantially ribbon-shaped element that has an L-shape when viewed from a top plan view as in FIG. 10. In at least some embodiments, conductive members 54 may be glued within their respective channels 72.

Referring to FIGS. 4 and 6 through 10, the exemplary tile 12 includes sixteen stationary floor contacts 26 where each contact is mounted to one of the conductive members 54 proximate a distal end thereof and generally at a location aligned with one of the substrate openings or recesses 84. Each contact 26 extends substantially perpendicular to the surface of the conductive member 54 to which it is attached and includes a semi-spherical distal end 69. The thin and generally resilient portion of the conductive member 54 below a contact 26 allows for some flexing action into an adjacent substrate opening 84 so that large force applied to the exposed end 69 of a contact can be absorbed resiliently to some extent.

Figure 7:
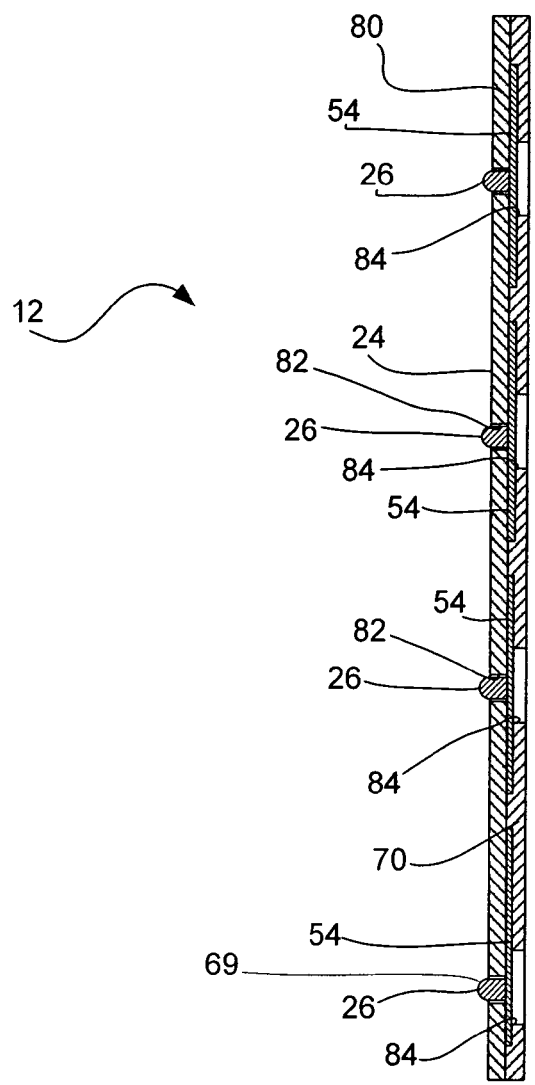
FIG. 7 is a cross sectional view taken along the line 7-7 of FIG. 6.
Figure 9:
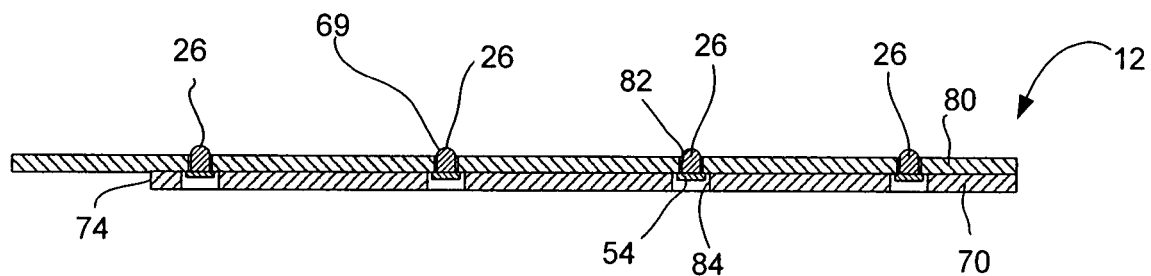
FIG. 9 is a cross sectional view of the tile assembly of FIG. 6 taken along the line 9-9.

Covering layer 80 may be formed of any type of conventional floor covering such as carpet, wood, ceramic, clay tile, plastic, rubber, etc. The covering layer has a top surface 24 and a bottom surface 33 and has a thickness (not labeled) between the top and bottom surfaces. Referring specifically to FIGS. 7 and 9, covering layer 80 forms a plurality of openings 82 that, when the tile 12 is assembled, are aligned with the floor contacts 26 so that each floor contact 26 extends through one of the openings. As best seen in FIGS. 7 through 9, once assembled, the semi-spherical distal ends 69 of the contact 26 protrude past the top surface 24 of the covering layer 80. In at least some embodiments each contact 26 protrudes past the top surface 24 by at least $1/32^{nd}$ of an inch while in other cases the contacts 26 protrude past top surface 24 by at least $1/16^{th}$ of an inch. Here, it is believed that these protruding dimensions will be sufficient for forming contact with moveable contacts without substantially impeding movement of furniture on the floor structure 11.

The spacing between stationary floor contacts and the contact dimensions are selected/designed such that, given the dimensions and spacing of the moveable contacts 46 on the undersurface of the shoe 42, when a furniture component including the shoe is supported by a floor structure formed using the tiles, at least one moveable contact 46 always contacts a stationary floor power contact at least one moveable contact always contacts a floor ground contact and none of the moveable contacts contacts more than one floor contact at any time. Thus, for instance, where the diagonal dimension of each moveable contact 46 is four inches, the distance between stationary floor contacts 26 has to be greater than four inches and where the adjacent moveable contacts are separated by one inch, the floor contacts 26 have to have dimensions of less than one inch (e.g., $3/4^{th}$ of an inch, $1/4^{th}$ inch, etc.). In some embodiments each contact has an exposed surface that is between $1/4^{th}$ and one square inch.

Figure 5:
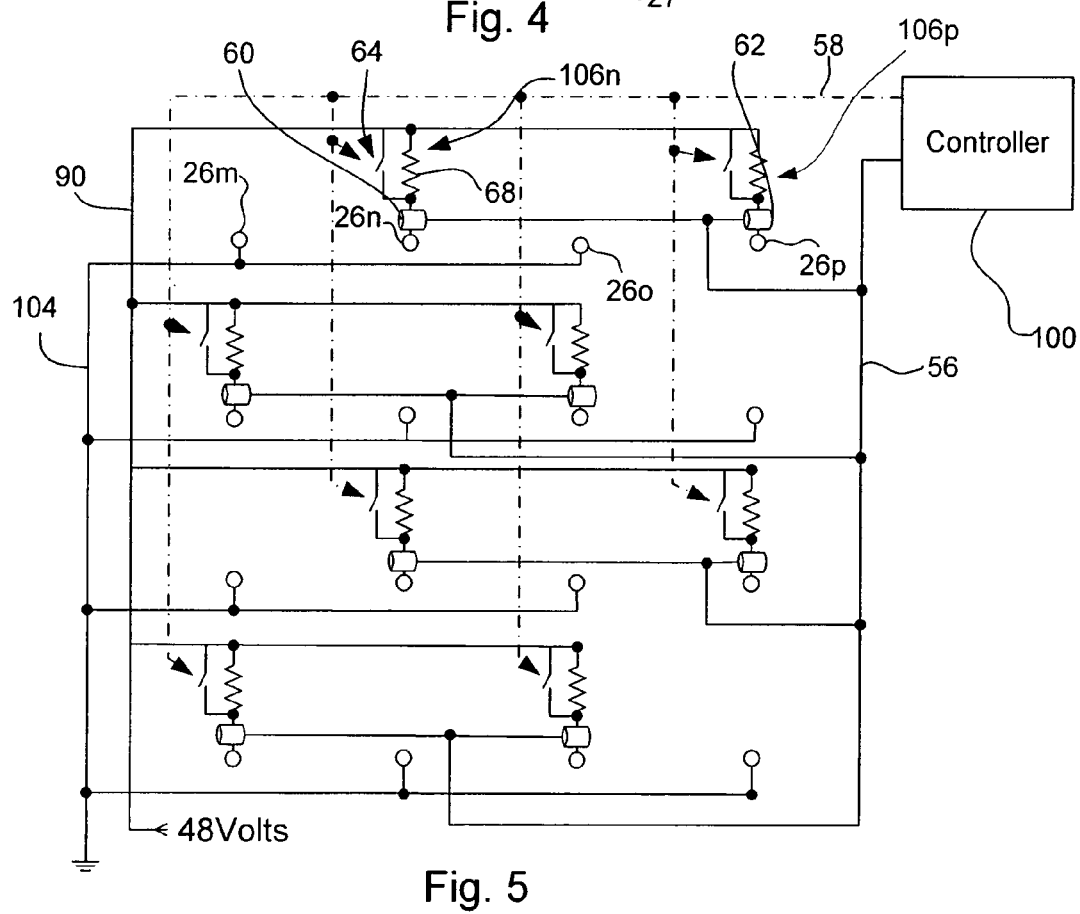
FIG. 5 is a schematic illustrating various components of the floor configuration of FIG. 1.
Figure 6:
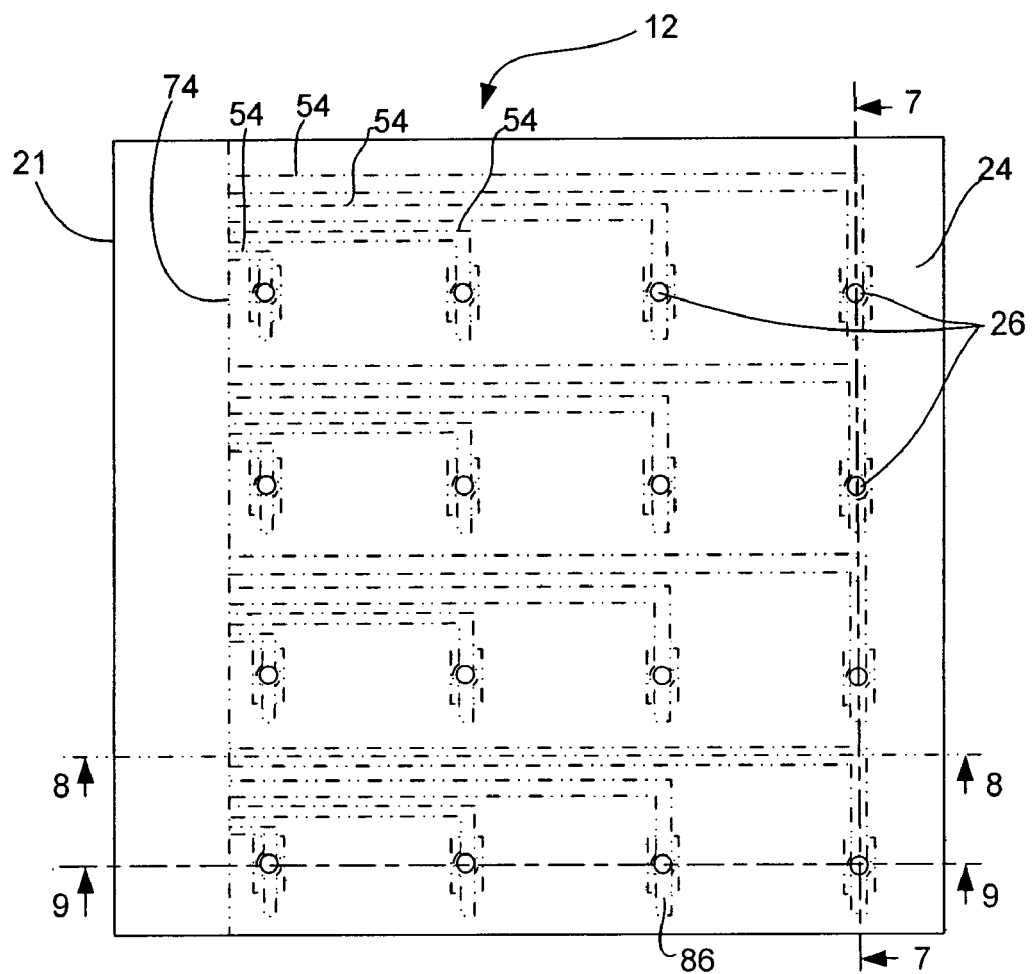
FIG. 6 is a view similar to FIG. 4, albeit showing various tile assembly components in phantom.
Figure 10:
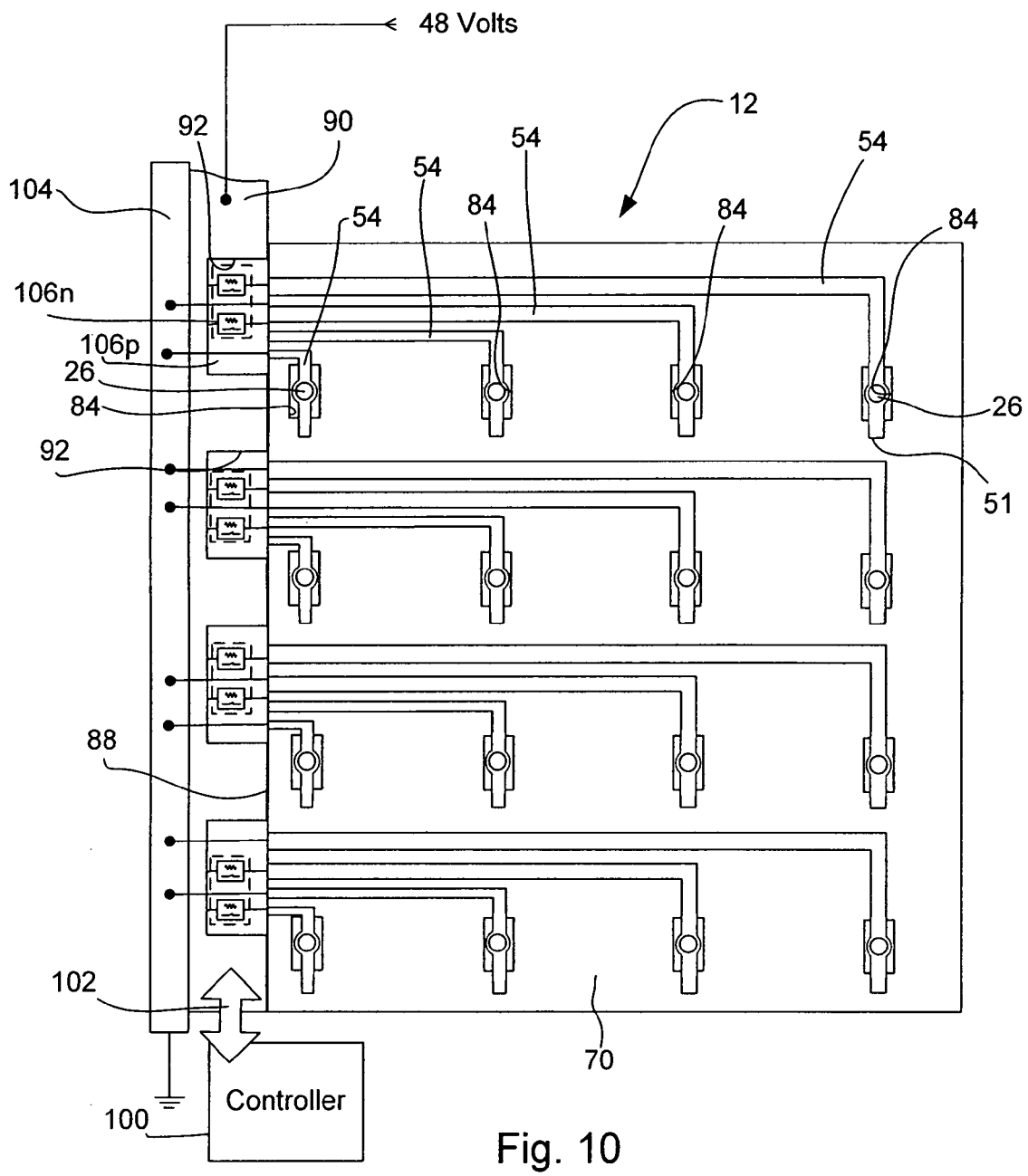
FIG. 10 is a top plan view of the tile assembly of FIG. 6, albeit where a covering layer has been removed and power and ground bus bars are shown.

Referring now to FIGS. 1, 5 and 10, in addition to the power floor tiles 12, exemplary floor structure 11 includes a voltage bus bar 90, a ground bar or linkage 104, a controller 100 and a plurality of switching devices 66. In the illustrated example, bus bar 90 is linked to a forty-eight volt power source and can be selectively linked to at least a subset of the stationary floor contacts 26 via conductive members 54 and the switching devices 106. To this end, as best shown in FIG. 5, in at least some embodiments, every other contact 26 on tile 12 is connected to the power bus bar 90 via a switching device to selectively link the bus bar 90 to the contact. For example, contact 26n in FIG. 5 is linked via switching device 106n to bus bar 90 while contact 26p is linked to bar 90 via switching device 106p. Here, intermediate contacts 26m and 26o are linked to ground bar 104.

Figure 10A:
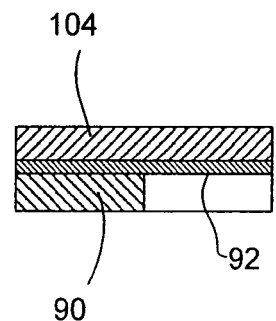
FIG. 10A is a cross sectional view of an exemplary power/ground bus bar assembly.

In the illustrated example, the bus bar 90 forms notches 92 intermittently along its long edge that is to face substrate 70 (see FIG. 10) for accommodating switching device (e.g., 106n, 106p, etc.). Here, in at least some embodiments, the switching devices may be supported by bar 90, in some embodiments the switching devices may be supported by substrate 70 while in still other embodiments the switching devices may be supported independently. In some embodiments, referring to FIG. 10A which shows a cross section of an exemplary laminated power/ground bar, the ground bar 90 may reside above the power bar 104 where the power bar 90 forms switch receiving recesses 92 and the ground bar 104 forms a cover over the recesses 92 to protect the switching devices from the weight of objects/persons supported there above.

Referring again to FIG. 10, it is contemplated where the multiple (e.g., 20) tile subassemblies are positioned so that edges are aligned to form a line, bar 90 may have a length dimension so that it extends along the aligned edge of all of the aligned tiles 12. Similarly, ground bar/linkage 104 may be multiple tiles in length.

Each of the switching devices (e.g., 106n, 10p, etc.) is similarly constructed and operates in a similar fashion and therefore, in the interest of simplifying this explanation, only switching device 106n will be described here in detail. In at least some embodiments, device 106n includes a resistor 68 and a solid state switch 64. Resistor 68 and switch 64 are linked in parallel and connect contact 26n to bus bar 90. Controller 100 is programmed to control operation of switch 64. Resistor 68 is selected so that, when switch 64 is open, a small amount of current (e.g., less than 20 milliamps and, in some embodiments approximately 3 milliamps) passes through resistor 68 to contact 26n. This small current is referred to hereinafter as a signal current. When switch 64 is closed thereby shorting contact 26n to bus bar 90, the 48 volt source is linked to contact 26n and a large current (e.g., 3 to 20 amps, depending on the load) is applied.

Referring still to FIG. 5, a sensor (e.g., 60, 62, etc.) is provided for each one of the switching devices (e.g., 106n, 106p, etc.) for sensing the current drawn at an associated contact (e.g., 26n, 26p, etc) as will be described in greater detail below. Each of the sensors 60, 62, etc., is linked to controller 100 so that controller 100 can obtain information therefrom.

Referring still to FIGS. 5 and 10, ground bar or linkage 104 is linked via a subset of the conductive members 54 to each of the contacts 26 (e.g., to a ground contact) that is not associated with one of the switching devices 106n, 106p, etc. Thus, every other contact 26 on tile 12 is linked to ground via bar 104. In FIG. 5, exemplary contacts 26m and 26o are linked to ground via bar 104.

Referring still to FIG. 10, power bar 90 and bus bar 104 may be constructed in a laminated form separated by an insulator (se FIG. 10A) or, in the alternative, may be provided as separate bars positioned in a side-by-side fashion as shown in FIG. 10 with an insulator (not illustrated) there between. Whatever their design, the bars 104 and 90 should be designed so that they together fill in the space below edge 21 of cover layer 80 (see again FIG. 8). Thus, for instance, where the bars 90 and 104 form a laminate, the laminate should have a combined thickness substantially equal to the thickness of substrate 70.

Figure 11:
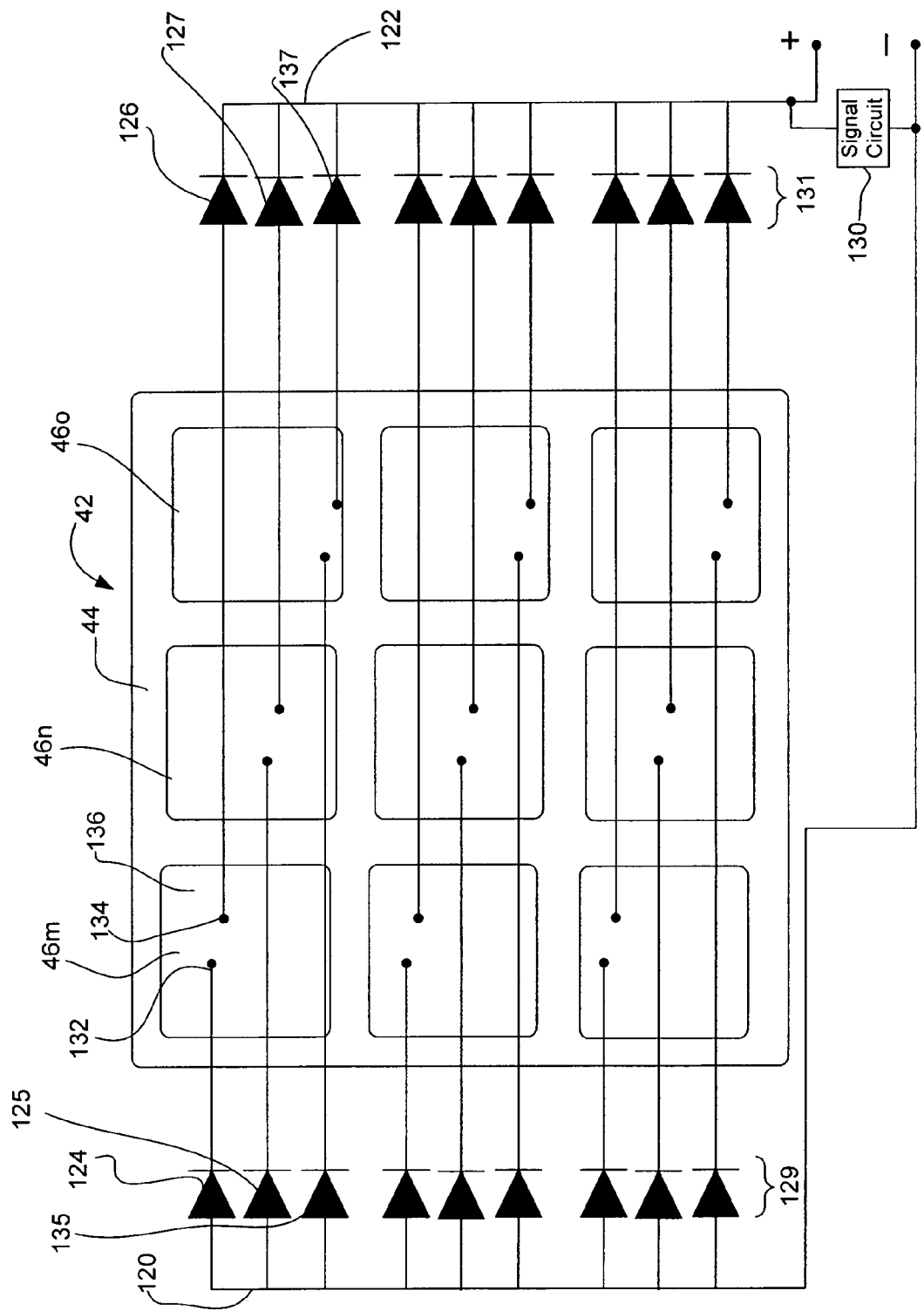
FIG. 11 is a schematic diagram illustrating various components of the pickup shoe of FIG. 3.

Referring once again to FIGS. 2 and 3 and also now to FIG. 11, a subset of the components that comprise shoe 42 are shown in FIG. 11. In FIG. 11, in addition to undersurface 44 and moveable contacts 46, exemplary shoe 42 includes a plurality of diodes collectively identified by numerals 129 and 131, a signal circuit 130, a positive rail and a ground rail 122 and 120, respectively. The diodes include a subset of nine negative rail diodes 129 and a subset of nine ground rail diodes 131. Each of the ground rail diodes 129 includes an anode linked to the ground rail 120 and a cathode linked to a separate one of the moveable contacts 46. For example, ground rail diode 124 has an anode linked to rail 120 and its cathode is linked to moveable contact 46m at point 132. Similarly, ground rail diode 125 is linked between ground rail 120 and moveable contact 46n while ground rail diode 135 is linked between negative rail 120 and moveable contact 460.

Each positive rail diode 131 includes a cathode linked to the positive rail 122 and an anode linked to a separate one of the moveable contacts 46. For example, positive rail diode 126 has an anode linked at 134 to moveable contact 46*m* and a cathode linked to rail 122 while diodes 127 and 137 have anodes linked to moveable contacts 46*n* and 46*o* and cathodes linked to rail 122. Here, it should be appreciated that when positive voltage is provided to one of the moveable contacts 46 and another contact is linked to ground, the voltage generates a current directed through an associated positive rail contact 131 to rail 122 and current is provided to the load. Therefore the diodes 129 and 131 operate as a rectifier bridge.

Referring still to FIG. 11, signal circuit 130 is linked across the positive and ground buses 122 and 120, respectively, and therefore receives positive current delivered to moveable contact 46*m*. When signal circuit 130 receives current from moveable contact 46*m*, signal circuit 130 is energized or activated to affect the way in which the low signal current is drawn by the furniture component in a way that is recognizable by the floor/system controller 100 as a signal that is associated with the furniture component. Thus, for instance, circuit 130 may be programmed to open and close a switch between rails 120 and 122 at a 1000 Hz frequency thereby causing the low signal current to flow and cease flowing from the floor contact at a 1000 Hz frequency. In the alternative some more complex frequency changing pattern may be performed by circuit 130.

Referring again to FIG. 5, the current drawn by signal circuit 130 is sensed by the sensor (e.g., 60, 62 in FIG. 5) associated with the stationary floor contact through which the current passes and controller 100 recognizes the current draw pattern as representing a furniture unit. In some embodiments, the current draw pattern generated by signal circuit 130 is simply recognized as a furniture identifier while in other embodiment the signal may provide additional information to controller 100 indicating specific characteristics of the power required by the furniture component associated with the shoe 42. Thus, for instance, 1000 Hz may indicate that a 48 volt power source should be linked to the floor contacts while a 500 Hz signal indicates that a 12 volt source should be linked.

Figure 12:
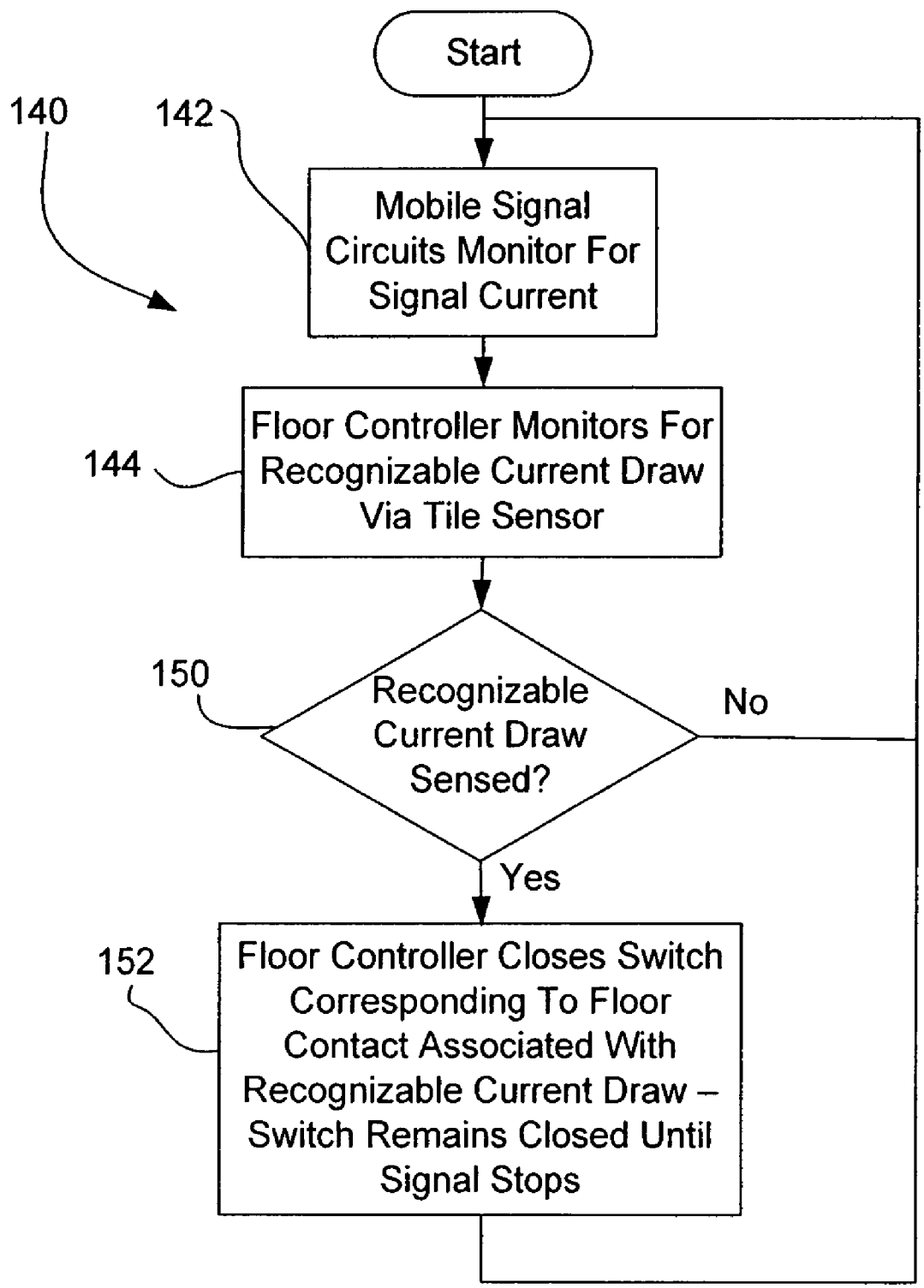
FIG. 12 is an inventive method of delivering power to furniture.

Referring now to FIG. 12, an exemplary method 140 for providing power to furniture components using the systems described above is illustrated. Referring also to FIGS. 1, 5 and 11, initially it will be assumed that, for a specific floor tile 12 as shown in FIG. 5, no moveable contacts 46 make contact with any of the stationary floor contacts 26 and therefore, each of the switches (e.g., 64) associated with the tile 12 are open. During operation, at block 144, the floor controller 100 in FIG. 5 monitors for a recognizable current draw pattern via each of the tile sensors. Where no recognizable current draw pattern occurs at block 150, control passes back up to block 144 where monitoring continues.

Next, it will be assumed that moveable shoe contact 46*m* in FIG. 11 makes contact with stationary floor power contact 26*n* in FIG. 5. When moveable contact 46*m* contacts floor contact 26*n*, the low signal current passes through resistor 68, stationary contact 26*n* and moveable contact 46*m* to signal circuit 130. Upon receiving the current, signal circuit 130 is activated and draws the low signal current in a specific pattern (e.g., 1000 Hz). The current draw pattern is sensed by sensor 60 at block 150 and is provided to controller 100. Upon receiving the current draw signal, controller 100 recognizes the current draw pattern as associated with a furniture component requiring power and generates a control signal at block 152 via control line 58 which is provided to switch 64 thereby causing switch 64 to close. When switch 64 closes, the power rail 90 is linked to moveable contact 46*m* via contact 26*n* and a high current required by the furniture component is provided thereto. The signal circuit 130 continues to draw current until moveable contact 46*m* no longer makes contact with floor contact 26*n* at which point controller 100 again opens switch 64 thereby disconnecting contact 26*n* from the power rail 90.

Figure 13:
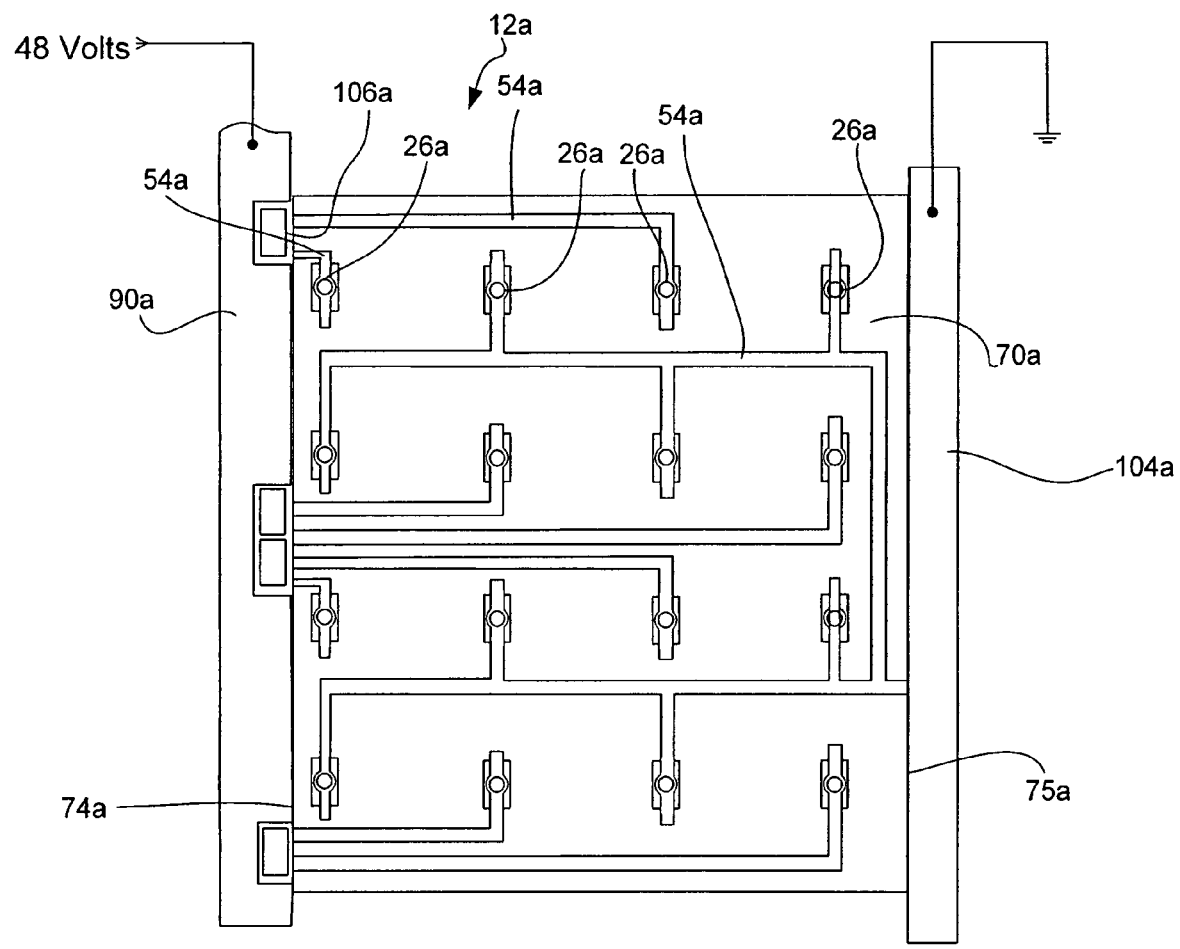
FIG. 13 is a view similar to that in FIG. 10, albeit showing a different tile configuration.

Referring once again to FIG. 10, while the embodiment above is described as one wherein all of the conductive members 54 extend to a single supporting substrate edge, in at least some embodiments the conductive members may extend to more than one edge. To this end, a second exemplary tile configuration and associated power and ground rails is shown in FIG. 13. In FIG. 13, components that are similar to the components described above with respect to FIG. 10 and other related figures are identified by the same number followed by an "a". For example, the tile assembly in FIG. 13 is labeled 12*a*, conductive members are labeled 54*a*, etc. In the FIG. 13 embodiment, the power bar rail 90*a* extends along a first edge 74*a* of substrate 70*a* and the ground bar 104*a* extends along a second edge 75*a* opposite the first edge 74*a*. Conductive members 54*a* to be linked to the power rail 90*a* extend to edge 74*a* while the conductive members 54 to be linked to ground bar extends to edge 75*a* for connection. In this embodiment bar 90*a* only includes three recesses 92*a* for switching devices as multiple devices are aggregated into a single recess. Here, a simplified pattern of grounding conductive members 54*a* is configured to reduce the number of contacts between the ground bar 104*a* and the tile mounted conductive members thereby resulting in a more robust design.

Figure 14:
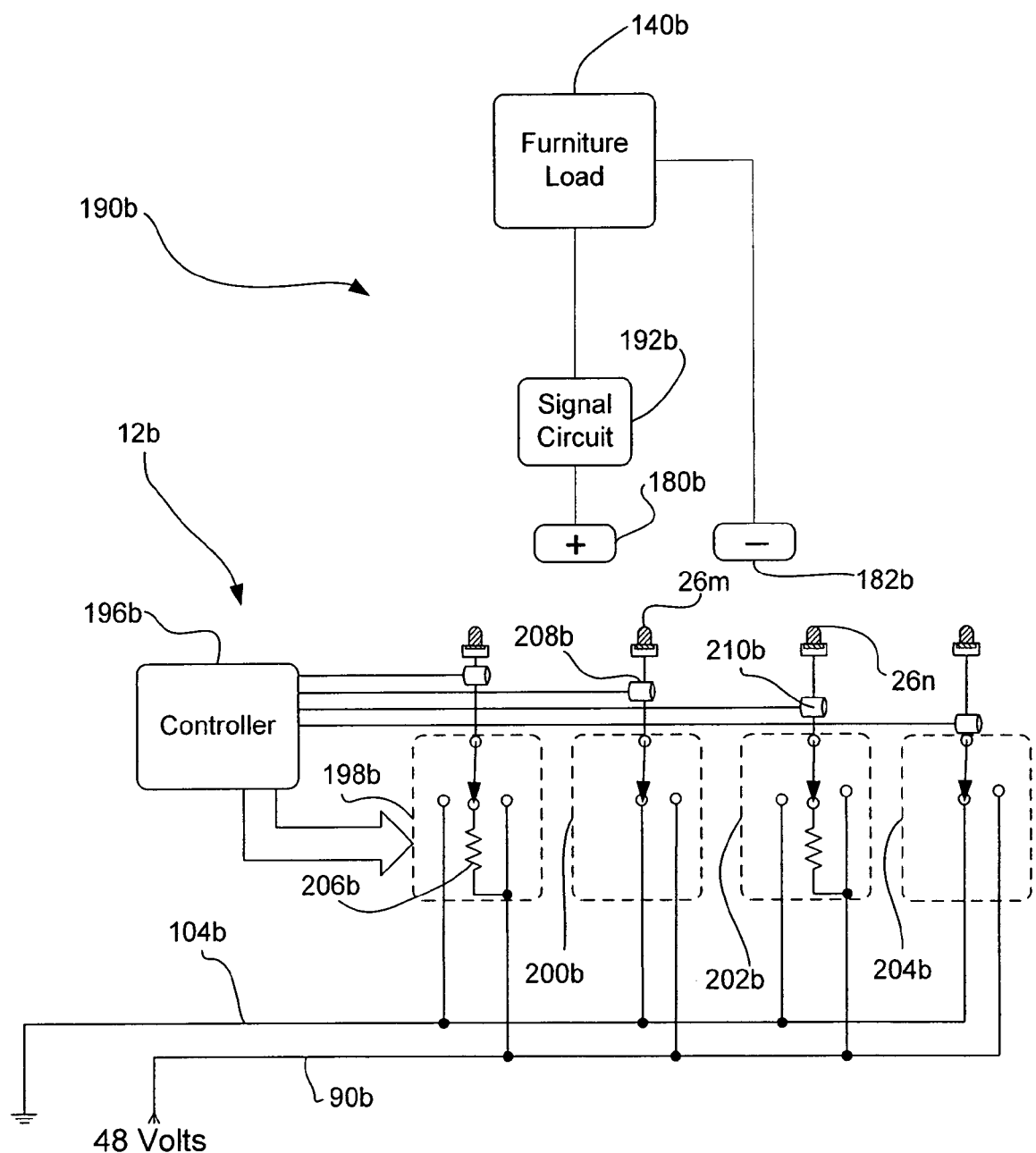
FIG. 14 is a schematic diagram illustrating another inventive power delivery system.

While the system described above includes furniture components that each include a rectifier (see again FIG. 11), in at least some embodiments it is contemplated that furniture components may not include rectifiers and may, instead, have permanently positive and permanently negative moving contacts. In this case, instead of providing a floor structure that has ground contacts that are always connected to ground and power contacts that can provide power, all of the contacts included in the tile have to be able to be linked to either a power source or ground, depending upon which of the moveable contacts makes contact with the floor contact. To this end, a third exemplary embodiment that is consistent with at least some aspects of the present invention is shown in FIG. 14 that includes a furniture assembly 190*b* and a tile assembly 12*b*. Although shown schematically, it should be appreciated that the configuration shown in FIG. 14 may be implemented easily by minimally modifying the floor structure configuration described above with respect to FIGS. 4 through 10. Here, the main differences between the floor structure described above and the structure of FIG. 14 are that a separate switching device is provided for each of the contacts included in tile 12*c* (as opposed to the case above where switching devices are only provided for every other contact in a tile), a first subset of the switching devices capable of linking an associated contact to ground, to a power source through a resistor or directly to the power source and a second sub set of the switching devices capable of linking an associated contact to ground or directly to a power source. Here, the controller controls the floor switches as a function of the polarity of the contactors that make contact with the floor contacts.

Referring still to FIG. 14, the furniture configuration 190*b* includes a furniture load 140*b* that is linked to positive and negative moveable contacts 180*b* and 182*b* (here there may be more (e.g., 9) than two moveable contacts). Signal circuit 192*b* is linked to the positive moveable contact 180*b* to receive current therefrom. As in the case of the system described above with respect to FIG. 11, when the signal circuit 192*b* receives a low signal current, the circuit is activated and consumes or draws the low signal current according to a frequency pattern that can be used to recognize that a floor contact is linked to an associated furniture contactor. Here, it is contemplated that circuit 192*b* would draw current at one of two distinct frequencies associated with the specific furniture component as a function of whether or not positive and negative contacts 180*b* and 182*b* are linked to positive and ground floor contacts or to ground and positive floor contacts, respectively. Once the positive and negative moveable contacts are identified by controller 196*b*, controller 196*b* controls switches accordingly.

Referring still to FIG. 14, separate sensors (e.g., 208*b*, 210*b*, etc.) are provided for each of the moveable contacts for sensing the current draw patterns and for providing those patterns to controller 196*b*. As indicated above, each of the floor contacts 26*m*, 26*n*, etc., is linked to a separate switching device. In FIG. 14, there are four contacts and four switching devices 198*b*, 200*b*, 202*b* and 204*b* are provided, a separate device for each one of the contacts. Every other one of the switching devices (e.g., 198*b*, 202*b*, etc.) in FIG. 14 are similar and operate in a similar fashion and therefore, in this explanation, only device 202*b* will be described herein in detail. Device 202*b* is capable of linking contact 26*n* to any of a ground linkage 104*b*, directly to power bus 90*b* or through current limiting resistor to the power bus 90*b*. Intermediate switching devices 200*b*, 204*b*, etc., that reside between adjacent three pole devices 198*b*, 202*b*, etc., are each two pole switching devices that are normally linked to ground linkage 104*b* and that can be switched directly to power rail 90*b*.

Figure 15:
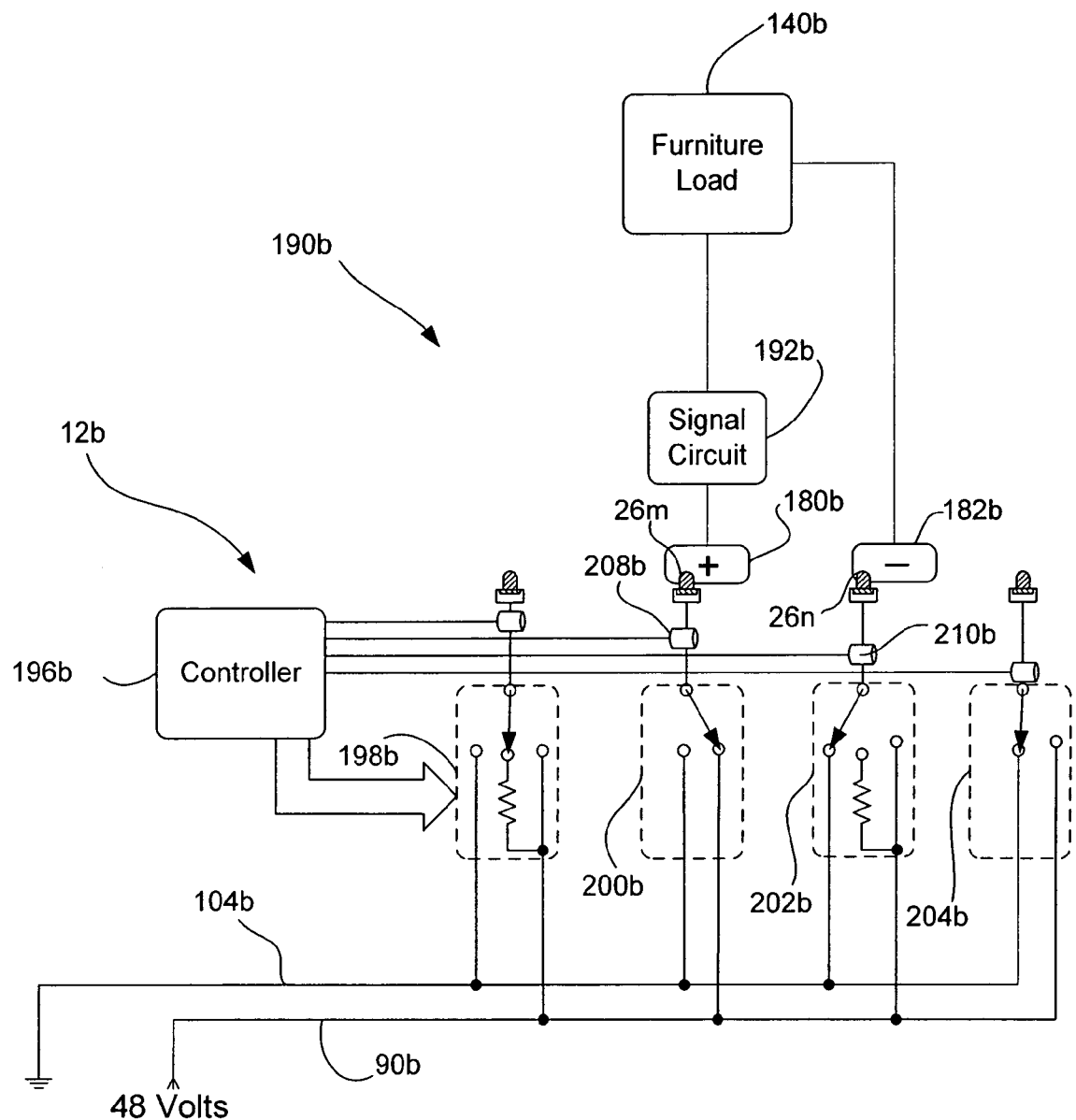
FIG. 15 is similar to FIG. 14, albeit showing a furniture component linked to a power floor structure for receiving power therefrom.

In operation, as shown in FIG. 14, when none of the floor tile contacts (e.g., 26*m*, 26*n*, etc.) is in contact with a moveable furniture contact, each of the floor contacts are linked through switching device resistors to the power bus 90*b* or to ground bus 104*b* and the resistors limit any possible current to the contacts. Referring now to FIG. 15, once moveable furniture contacts make contact with floor contacts, the small signal current is delivered through the switching device resistor to the signal circuit 192*b* which in turn draws current in frequency patterns that indicate polarities of corresponding moveable contacts and the specific furniture component. Thus, for instance, where positive contact 180*b* is linked to an initially positive (e.g., ungrounded) floor contact (see contact 26*n* in FIG. 14) and negative contact 182*b* is linked to an initially grounded floor contact (see contact 26*m* in FIG. 14), signal circuit 192*b* may draw 1000 Hz current. Similarly, circuit 192*b* may draw a 500 Hz current when contacts 180*b* and 182*b* are linked to initially negative and positive floor contacts, respectively. Controller 196*b* identifies which floor contacts are in contact with the furniture contacts and the polarities of those furniture contacts and then controls the switching devices that are associated with the contacted contacts to link the negative furniture contact 182*b* to ground (see the state of switching device 202*b* in FIG. 15) and the positive contact 180*b* directly to the power bus bar 90*c* (see the state of switching device 198 in FIG. 15). In the above example, when positive and negative contacts 180*b* and 182*b* are linked to currently positive and ground floor contacts so that a 1000 Hz signal is generated by circuit 192*b*, the switch associated with the currently positive floor contact is switched so that positive linkage 90*b* is directly linked to the positive contact 180*b* and the grounded floor contact switching device remains grounded. However, as shown in FIG. 15, when positive and negative contacts 180*b* and 182*b* are linked to initially grounded and positive contacts 26*m* and 26*n*, respectively (see FIG. 14) so that a 500 Hz signal is generated by circuit 192*b*, the switch associated with the initially positive floor contact 26*n* is switched to link that contact to ground linkage 104*b* and the switch associated with the initially negative floor contact 26*m* is switched to link that contact to positive rail 90*b* and thus floor contact polarity is altered.

The switching state of the floor contact that contacts the positive moveable contact 180*b* is maintained until the contact is broke at which time the signal circuit 192*b* ceases drawing the current pattern. The state of the floor contact that contacts the negative contact 182*b* may be changed whenever controller 196*b* recognizes that another floor contact has made contact with negative moveable contact associated with the furniture component. Thus, here, the controller 196*b* would only link one floor contact to ground for each furniture component and the floor contact linked to ground would always be the floor contact that most recently made contact with a negative polarity moveable contact on a furniture component.

Figure 16:
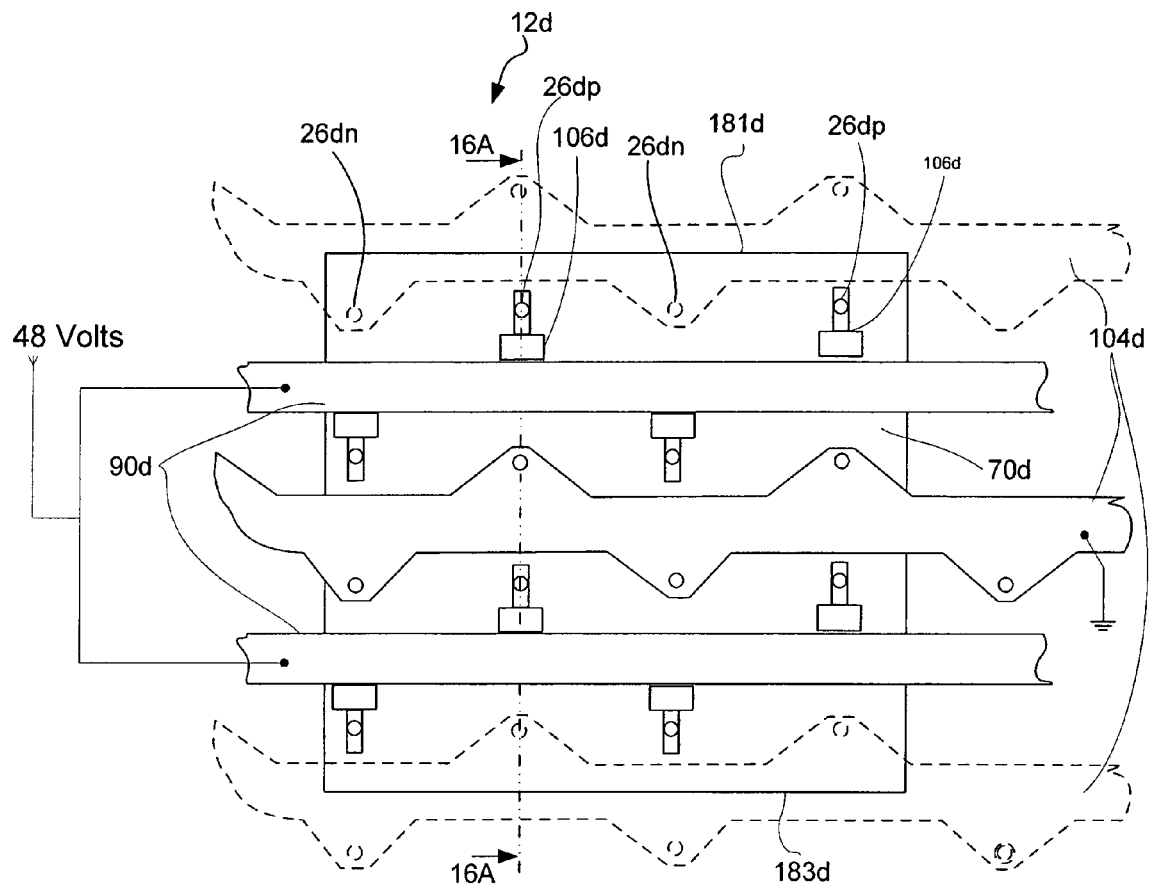
FIG. 16 is a top plan view of another inventive power tile and power and ground bus bar configuration.
Figure 16A:
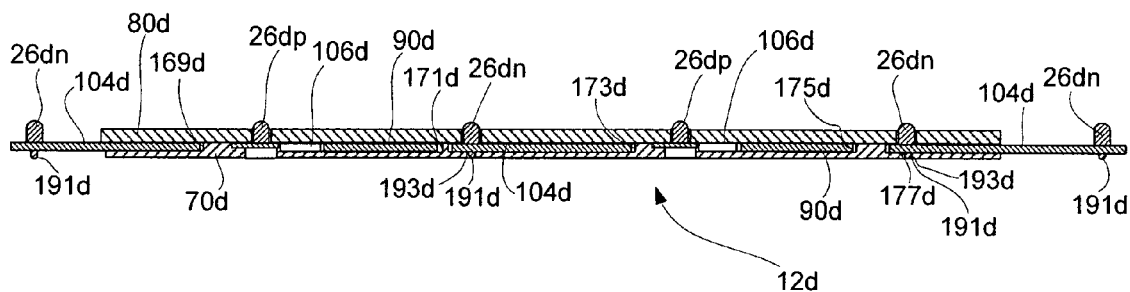
FIG. 16A is a cross sectional view taken along the line 16A-16A of FIG. 16.
Figure 17:
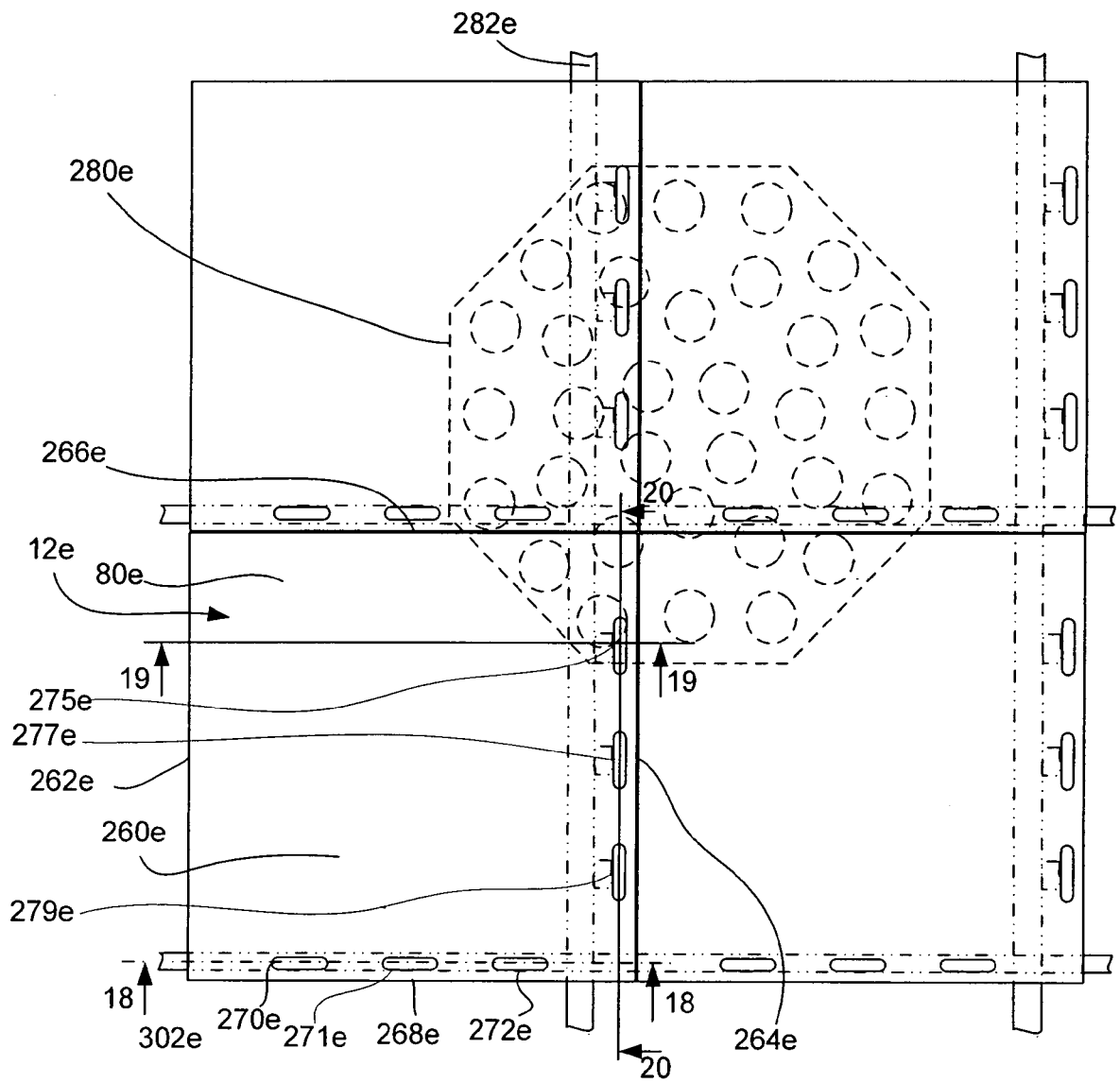
FIG. 17 is a top plan view of yet another power delivery system consistent with at least some aspects of the present invention.

Referring to FIGS. 16 and 16A, another tile bus bar configuration 12*d* is shown that includes a supporting substrate 70*d* that forms five channels 169*d*, 171*d*, 173*d*, 175*d* and 177*d* in a top surface for receiving two power bus bars 90*d* and three ground bars 104*d*. Here, a first ground bar receiving channel 169*d* is formed along a first substrate edge 181*d*, a second ground bar receiving channel 177*d* is formed along a second edge 183*d* opposite the first edge 181*d* and the third ground bar receiving channel 175*d* is formed centrally between edges 181*d* and 183*d*. Power bus bar receiving channel 171*d* is formed between channels 169*d* and 173*d* while channel 175*d* is formed between channels 173*d* and 177*d*.

As see in FIG. 16, each power bar 90*d* has a width dimension so that the edges thereof are adjacent substrate mounted switching devices 106*d* to either side thereof. Each ground bar 104*d* has a circuitous shape such that a portion thereof extends between the locations of power contacts 26*p* where the configuration is assembled so that ground contacts 26*n* can be directly connected to or integrally formed with the ground bar 104*d*. The ground bar receiving channels have shapes similar to the ground bars to accommodate the ground bars. Thus, here, minimal if any substrate mounted conductive members are required in addition to the bus bars that operate as the conductive members. In addition, here, as shown in FIG. 16A, each ground bar 104*d* may be provided with studs 191*d* that extend in a direction opposite contacts 26*n* and each substrate 70*d* may be provided with holes 193*d* for receiving the studs to help align and mechanically link adjacent tiles (e.g., here each bar 90*d* and 104*d* will typically be many tiles (e.g., 10) in length). Although not shown bard 90*d* may also be provided with aligning studs. As shown, ground bars 104*d* that are received in the edge channels 169*d* and 177*d* may extend between tile 12*d* and adjacent tiles.

Figure 21:
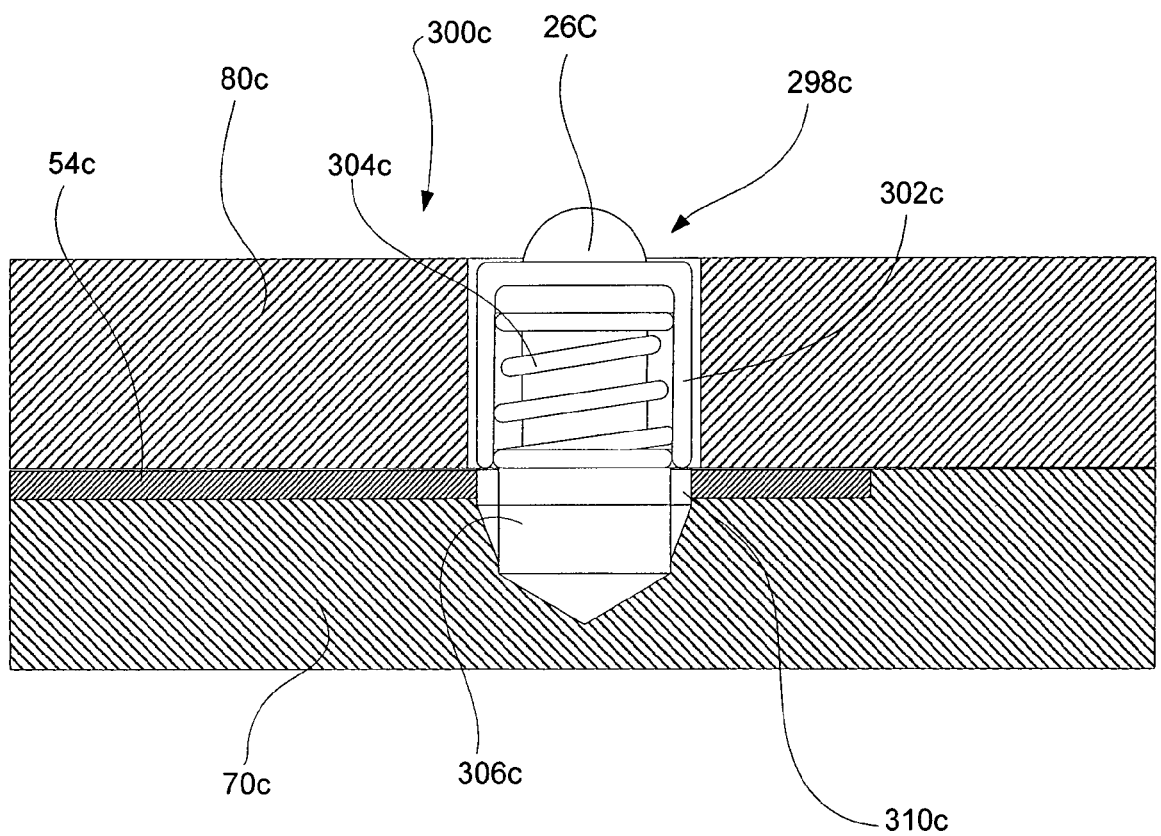
FIG. 21 is a partial cross sectional view of a spring loaded and decouplable power contact installed in a floor structure.

Referring to FIG. 21, a decouplable and spring loaded/biased floor contact assembly 298*c* is shown installed in a substrate/covering layer assembly 300*c*. As shown, subassembly 298*c* includes a contact 26*c*, a guide 302*c*, a spring 304*c* and a first coupler 306*c*. Coupler 306*c* may be a threaded male member or other type of mechanical linking component. Guide 302*c* extends up from coupler 306*c* and supports contact 26*c* and spring 304*c*. Spring 304*c* is loaded by the contact 26*c* and forces contact 26*c* toward the illustrated position. Substrate 70*c* forms a second coupler 310*c* that cooperates with first coupler 306*c* to releasably couple subassembly 298*c* to substrate 70*c*. To this end, coupler 310*c* may be a threaded hole or other mechanical linkage.

Coupler 310c is electrically linked to conductive member 54c so that when contact subassembly 298c is coupled to substrate 70c, contact 26c is electrically linked to member 54c.

Here, when force is applied to the exposed contact surface 69c, contact 26cmay be forced downward against the spring force and at least partially into the opening formed to covering layer 70c so that contact 26c is not damaged by the applied force. If subassembly 298c is damaged, subassembly 298c can be decoupled from substrate 70c and replaced. Here, each of the releasable coupling and the spring biased aspects of the FIG. 21 embodiment may be used separately or they may be used together in any of the embodiments described above.

While each of the embodiments described above is described in context of tile assemblies that include small nodule type contacts that have semi-spherical exposed surfaces that protrude past the top surface of a covering layer, other embodiments are contemplated that have contacts having other shapes and where the contacts are arranged differently on the tiles. To this end, referring now to FIGS. 17 through 22, yet another exemplary floor structure and associated tile assembly 12e is illustrated. Exemplary tile 12e includes a substantially rigid supporting substrate to 60e, a ground conducting member 302e, a power conducting member 282e, generally elongated ground contacts 270e, 271e and 272e, generally elongated power contacts 275e, 277e and 279e and switching devices 298e. Substrate member 260e, like the substrates described above, can be formed of any rigid material and generally has a rectilinear shape. In this embodiment, substrate member 260e forms a channel in the top surface thereof adjacent edge 268e for receiving a generally ribboned shaped flat ground conductive member 302e that extends from tile edge 262e to opposite tile edge 264e. In addition, substrate member 260e forms a channel in its bottom surface for receiving flat ribbon shaped power conducting member 282e where the channel in the bottom surface is generally parallel to an adjacent edge 264e which extends from edge 268e to opposite tile edge 266e. Here, the substrate 260e is thick enough that the channels for receiving the ground and power conductive members are always separated and electrically isolated.

Figure 19:
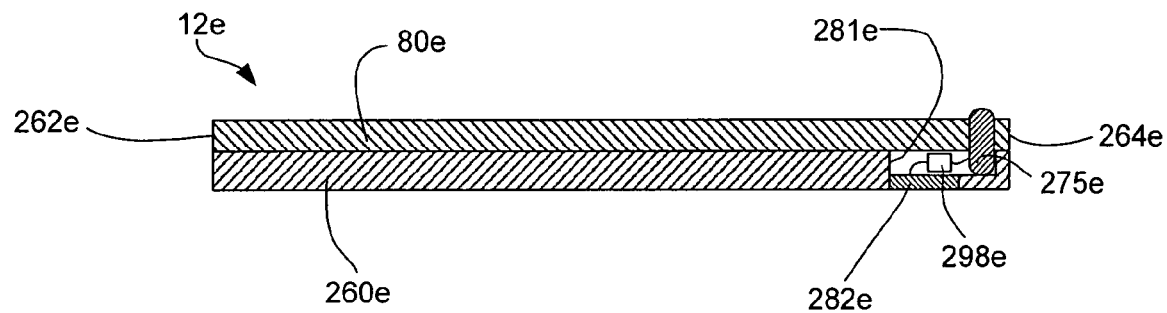
FIG. 19 is a cross sectional view taken along the line 19-19 in FIG. 17.
Figure 20:
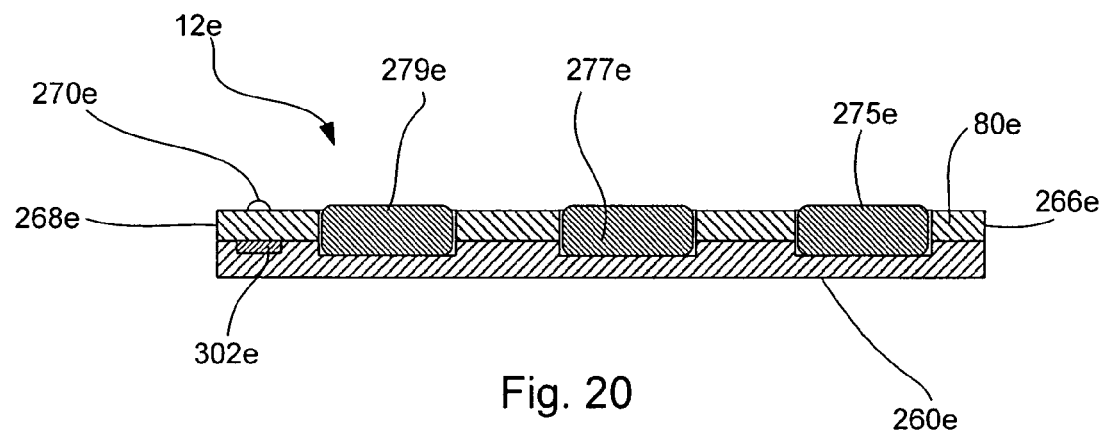
FIG. 20 is a cross sectional view taken along the line 20-20 in FIG. 17.

Referring now to FIG. 19, substrate member 260e forms openings 281e from the channel that receives the power conductive member 282e through the top surface of the substrate. Tile 12e forms three openings 281e that are spaced along edge 264e at locations where power contacts 275e, 277e and 279e are mounted. The contacts 27e, 277e and 279 are mounted adjacent the substrate openings (see FIG. 19 as an example) and separate switching devices 298e are provided for each of the contacts 275e, 277e and 279e within the associated opening. Each switching device 298e can be controlled like any of the devices described above to facilitate various switching functions depending upon the nature of the overall system.

Referring still to FIGS. 17 through 20, covering layer 80e can be formed using any conventional covering material such as carpet, wood, ceramic or clay tiles, etc., and forms elongated openings that align with the contacts 270e, 271e, 272e, 275e, 277e and 279e when the tile is assembled. Here, although not illustrated, it is contemplated that when tiles are placed adjacent to each other to form a floor structure, some mechanical linkage mechanism would be provided for linking power conductive members 282e in adjacent tiles and the ground conductive members 302e and adjacent tiles. In the alternative, the power and ground conductive members may be provided as long bars that extend along aligned channels formed by multiple tiles in a fashion similar to that described above with respect to FIG. 10.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Thus, the invention is to cover all modifications, equivalents, and alternatives falling within the spirit and scope of the invention as defined by the following appended claims. For example, while the above examples include controllers that continue to provide power to furniture as long as a specific current pattern is continually drawn, in other embodiments the controller may be programmed to, after power is provided via contacts, monitor the current drawn and, when the current draw through a floor contact changes appreciably (e.g., goes to a zero value, drops or increases significantly, etc.), cut off power to the contact.

As another example, while the example above includes gaps in shoe contacts that are larger than floor contact sizes, in other embodiments, the gaps between shoe contacts may be substantially smaller than floor contact dimensions. For instance, where a floor contact has a ¼ inch diameter, in some cases the shoe contact gaps may be $1/10^{th}$ of an inch so that two adjacent shoe contacts can contact one floor contact at the same time. These relative dimensions can reduce overall shoe size and can better ensure that at least one shoe contact always remains linked to a positive floor contact and at least one shoe contact always remains linked to a grounded floor contact.

As one other example, while described as a floor system, the inventive system could in fact be applied in other applications such as to provide power within a desk top, within a wall surface, within a panel partition system, within a slat wall system to provide power to slat wall rails, etc. Moreover, in at least some cases it is contemplated that the hard contacts could be replaced by other conductive material that extends to a greater height than the top surface of a carpet material that forms the top of a floor structure.

To apprise the public of the scope of this invention, the following claims are made:

What is claimed is:

1. A floor tile assembly comprising:
   a plurality of floor tiles, each tile including:
   a substantially rigid supporting substrate member that includes top and bottom surfaces and an edge;
   at least a first conductive tile contact supported by the substrate member and extending to an exposed end; and
   a covering layer having top and bottom surfaces and a thickness dimension between the top and bottom surfaces, the covering layer forming a separate opening for each of the tile contacts, the openings aligned with the tile contacts so that each tile contact extends through a separate one of the openings, the covering layer having a thickness dimension between the top and bottom surfaces such that the exposed end of each tile contact protrudes past the top surface of the covering layer;
   wherein each supporting substrate and associated covering layer are shaped such that the tile can be arranged with other tiles in side by side fashion to provide a substantially contiguous floor structure.

2. The assembly of claim 1 including a plurality of conductive tile contacts.

3. The assembly of claim 1 further including electrically conductive members that extend from the edge of the substrate to each of the tile contacts.

4. The assembly of claim 1 further including a separate switching device linked to each of at least a subset of the tile contacts, each switching device for selectively linking and de-linking an associated contact to a power supply.

5. The assembly of claim 1 wherein each of the supporting substrate members and associated covering layers is substantially rectilinear.

6. The assembly of claim 1 wherein at least one of the top and bottom surfaces of the supporting substrate member forms channels from the edge of the substrate to locations adjacent the openings formed by the covering layer and wherein conductive members are received within the channels and extend from the edge of the substrate to the locations adjacent each of the openings.

7. The assembly of claim 6 wherein each conductive member is substantially flat and ribbon shaped and wherein, when a conductive member is received in one of the channels, an outward facing surface of the conductive member is substantially coplanar with the top surface of the supporting substrate member.

8. The assembly of claim 3 further including switching devices, a power supply and a ground linkage, the switching devices positioned between the power supply and a first subset of the conductive members for selectively linking separate ones of the conductive members in the first subset to the power supply, the ground linkage linking a second subset of the conductive members to ground.

9. The assembly of claim 8 wherein the tile contacts that are mounted to the conductive members in the first subset of conductive members include a first subset of tile contacts, the assembly further including a controller linked to the first subset of tile contacts, the assembly for use with an object to be powered that includes at least first and second electrical moveable contacts for contacting and receiving power from a pair of the tile contacts that protrude from the covering layer, the controller sensing when one of the first and second moveable contacts contacts one of the tile contacts in the first set and controlling at least one of the switching devices to provide power to the contacted moveable contact.

10. The assembly of claim 9 wherein each switching device includes a resistor in parallel with a normally open switch where the power supply is normally linked to each of the tile contacts through the resistor and wherein, when one of the moveable contacts contacts one of the tile contacts in the first subset of tile contacts, the controller closes the normally open switch to bypass the resistor and link the power source to the contacted tile contact.

11. The assembly of claim 1 wherein each exposed contact end has a surface area of less than one square inch.

12. The assembly of claim 11 wherein each exposed contact end is at least one inch away from the closest adjacent exposed contact end.

13. The assembly of claim 1 wherein each exposed contact end has a surface area of less than one quarter of an inch.

14. The assembly of claim 1 wherein the covering layer includes at least one of carpet, wood and tile.

15. The assembly of claim 1 wherein each of the exposed ends of the tile contacts forms a curved surface.

16. The assembly of claim 1 wherein each of the tile contacts is one of a nodule where the exposed surface is semi-spherical and an elongated member wherein each of the exposed surfaces is substantially longer than it is wide.

17. The assembly of claim 1 wherein the openings formed by the covering layer are substantially equi-spaced along the top surface of the covering layer.

18. The assembly of claim 1 including between four and sixteen tile contacts that protrude past the covering layer.

19. The assembly of claim 1 including at least nine tile contacts.

20. The assembly of claim 1 wherein the exposed end protrudes past the top surface of the cover layer by more than $\frac{1}{32}^{nd}$ of a inch.

21. The assembly of claim 9 wherein the object to be powered includes a furniture component.

22. The assembly of claim 21 wherein the furniture component includes one of a desk, a table, a chair, a lap, a shelving unit, a partition system, a privacy panel, a cart, and an easel.

23. The assembly of claim 1 for use with an object to be powered where the object to be powered includes at least a pair of moveable contacts for linkage to at least a pair of the tile contacts, the assembly further including a controller for sensing when at least one of the moveable contacts contacts one of the tile contacts and for linking the contacting moveable contact through the at least one contacted tile contact to the power source to provide power to the moveable contact.

24. The assembly of claim 23 wherein the pair of moveable contacts includes a positive moveable contact and a negative moveable contact, the controller further sensing when the positive and negative moveable contacts contact two of the tile contacts, determining the polarities of the moveable contacts and linking the positive and negative moveable contacts to the power source and ground, respectively.

25. The assembly of claim 23 wherein at least a subset of the tile contacts that protrude from the covering layer are grounded and wherein the grounded tile contacts and ungrounded tile contacts are arranged such that whenever the object to be powered is supported by the floor assembly, at least first and second moveable contacts contact grounded and ungrounded tile contacts, respectively.

26. The assembly of claim 25 wherein the power source is linked to each of the ungrounded tile contacts to provide a low sensing current and wherein, when a moveable contact contacts one of the ungrounded tile contacts, the power source provides high power current to the contacting moveable contact.

27. The assembly of claim 23 wherein the tile contacts are arranged and dimensioned such that, when the object to be powered is supported by the floor assembly, at least a pair of the moveable contacts on the object to be powered contact at least a pair of the tile contacts irrespective of the location of the object to be powered on the floor assembly.

28. The assembly of claim 23 wherein multiple objects to be powered may be supported by the floor assembly simultaneously and wherein the controller links at least one moveable contact of each of the supported objects to be powered to the power supply simultaneously.

29. The assembly of claim 1 wherein at least a subset of the tiles are arranged so that edges of the supporting substrates form an aligned edge line, the assembly further including an elongated conductive power bus bar that extends along the aligned edge line of the supporting substrates to provide power to the tile contacts.

30. The assembly of claim 29 wherein each of the tiles further includes a separate conductive member for each of the tile contacts and wherein each of the conductive members is supported by the supporting substrate and extends from the edge of the substrate adjacent the power bus bar to an associated tile contact.

31. The assembly of claim 30 further including a separate switching device for each of at least a subset of the conductive members for selectively linking the associated conductive member to a power supply.

32. The assembly of claim 31 wherein the switching devices are supported by the power bus bar.

33. The assembly of claim 31 wherein each switching device is supported by the tile that supports an associated conductive member.

34. The assembly of claim 29 further including an elongated conductive ground bar that extends along the supporting substrates to provide a ground connection to at least a subset of the tile contacts.

35. The assembly of claim 1 wherein the substrate includes oppositely facing first and second edges and forms channels that extend from the first edge to the second edge for receiving at least one power bus bar and at least one ground bus bar.

36. The assembly of claim 1 wherein each of the tile contacts is resiliently biased into the position where the exposed end protrudes past the top surface of the covering member and wherein, when downward force is applied to the exposed surface, the contact at least partially moves into an associated covering layer opening.

37. The assembly of claim 1 further including a separate first coupler for each of the tile contacts that is mounted to the supporting substrate and wherein each of the tile contacts includes a second coupler for coupling with one of the first couplers such that each tile contact is releasably couplable to the substrate.

38. A furniture power delivery system comprising:
a floor subassembly including:
    a covering layer forming a top surface for supporting furniture components;
    a plurality of electrically conductive floor contacts that extend through the covering layer and that include exposed ends that protrude past the top surface of the covering layer, the floor contacts arranged so that at least one of the floor contacts is adjacent and make contact with one of the moveable contacts irrespective of the location of the furniture component on the floor subassembly;
    a power supply;
    a plurality of switching devices normally linking the power supply to an associated floor contact to provide a low signaling current to the associated floor contact; and
    a controller for controlling the switching devices; and
a furniture component to be powered including more than one electrically conductive downwardly facing moveable contact;
wherein the floor contacts are dimensioned and arranged and the moveable contacts are dimensioned and arranged such that at least two of the moveable contacts contact at least two of the floor contacts when the furniture component is supported by the floor subassembly irrespective of the location of the furniture component on the floor subassembly.

39. The system of claim 38 wherein the furniture component further includes a signal circuit and wherein, when one of the moveable contacts of the furniture component contacts one of the floor contacts, the signal circuit draws the low signal current in a manner that is recognizable as an indication that a moveable contact of a furniture component is contacting the floor contact, the controller sensing the current drawn by the signal circuit, recognizing the power drawn as indicating a furniture component and increasing the current to the contacting floor contact and contacting moveable contact.

40. The system of claim 39 wherein the low signal current is less than 10 milliamps and where the current level is increased to more than 3 amps.

41. The system of claim 39 wherein the low signal current is less than 4 milliamps and where the current level is increased to more than 5 amps.

42. The system of claim 39 further including a plurality of ground contacts that extend through the covering layer and that include exposed ends that protrude past the top surface of the covering layer, the ground contacts arranged so that at least one of the floor contacts is adjacent and makes contact with one of the ground contacts irrespective of the location of the furniture component on the floor subassembly.

43. The system of claim 42 wherein each floor contact is separated from an adjacent floor contact by a ground contact.

44. A method for providing power to an object to be powered, the method comprising the steps of:
providing a first electrical moveable contact and a signal circuit on the object to be powered;
providing a floor assembly that includes a plurality of electrical floor contacts and a power source;
when the first electrical moveable contact contacts a first of the floor contacts in the first subset, providing a low signal current through the first contact and the first electrical moveable contact to the signal circuit where the signal current is sufficient to drive the signal circuit;
upon receiving the signal current, the signal circuit drawing the low signal current according to a pattern;
sensing the current draw pattern at the floor contact through which the current is drawn;
recognizing the current draw pattern as indicative of an object to be powered; and
increasing the current provided to the first of the floor contacts to a powering level sufficient to power the object.

45. The method of claim 44 wherein the step of providing a floor assembly includes providing a ground linkage that links a second subset of the floor contacts to ground.

46. The method of claim 45 wherein the step of providing a floor assembly further includes providing an assembly where the floor contacts are substantially equi-spaced along a top surface of the floor assembly and wherein distal ends of the floor contacts are exposed and protrude above the top surface of the floor assembly.

47. The method of claim 44 wherein the low signal current is less than 10 milliamps.

48. The method of claim 44 wherein the low signal current is substantially 3 milliamps.

* * * * *